(12) United States Patent
Tatewaki et al.

(10) Patent No.: US 7,284,634 B2
(45) Date of Patent: Oct. 23, 2007

(54) ELECTRIC POWER STEERING APPARATUS

(75) Inventors: Osamu Tatewaki, Gunma-ken (JP); Hiroshi Eda, Gunma-ken (JP); Toshihiro Fukuda, Gunma-ken (JP); Jun Okada, Gunma-ken (JP)

(73) Assignee: NSK, Ltd., Tokyo (JP)

( * ) Notice: Subject to any disclaimer, the term of this patent is extended or adjusted under 35 U.S.C. 154(b) by 0 days.

(21) Appl. No.: 10/119,699

(22) Filed: Apr. 11, 2002

(65) Prior Publication Data

US 2002/0148672 A1  Oct. 17, 2002

(30) Foreign Application Priority Data

| | | | |
|---|---|---|---|
| Apr. 13, 2001 | (JP) | | 2001-115603 |
| Jun. 27, 2001 | (JP) | | 2001-194825 |
| Mar. 4, 2002 | (JP) | | 2002-057538 |
| Mar. 6, 2002 | (JP) | | 2002-060736 |

(51) Int. Cl.
  *B62D 5/04* (2006.01)
  *F16H 55/00* (2006.01)
  *F16H 33/00* (2006.01)

(52) U.S. Cl. .................. 180/444; 180/443; 74/464; 74/640

(58) Field of Classification Search ............... 180/444, 180/443; 74/434, 462, 464, 424.71, 499, 74/216.3, 640, 388 PS
  See application file for complete search history.

(56) References Cited

U.S. PATENT DOCUMENTS

| | | | | |
|---|---|---|---|---|
| 2,869,383 A | * | 1/1959 | Rapp et al. | 74/388 PS |
| 3,013,440 A | * | 12/1961 | White | 74/446 |
| 3,199,364 A | * | 8/1965 | Dew | 74/460 |
| 3,602,058 A | * | 8/1971 | Beddoe | 74/434 |
| 4,188,821 A | * | 2/1980 | Elias | 73/862.31 |
| 4,593,780 A | * | 6/1986 | Saito | 180/444 |
| 4,719,813 A | | 1/1988 | Chalik | 74/409 |
| 4,724,917 A | | 2/1988 | Naito et al. | 180/79.1 |
| 4,754,829 A | | 7/1988 | Shimizu | 180/79.1 |
| 4,841,790 A | * | 6/1989 | Williston et al. | 74/388 PS |
| 4,987,963 A | * | 1/1991 | Oslapas et al. | 180/445 |

(Continued)

FOREIGN PATENT DOCUMENTS

DE  37 35 517  5/1988

(Continued)

OTHER PUBLICATIONS

Patent Abstract of Japan, JP 55 135265 A, Oct. 21, 1980 (Abstract).

(Continued)

*Primary Examiner*—Lesley D. Morris
*Assistant Examiner*—Daniel Yeagley
(74) *Attorney, Agent, or Firm*—Miles & Stockbridge PC

(57) ABSTRACT

An electric power steering apparatus comprises a rotary shaft member connected to a steering wheel, an elongate member, a rack-and-pinion mechanism, a ball screw mechanism constructed of a screw member, a nut member and a multiplicity of balls interposed between the screw member and the nut member, an electric motor unit, and a meshing type rotation decelerating mechanism including a plurality of meshing components. The meshing components include an output shaft pinion gear, a deceleration gear, and an intermediate gear, interposed between the output shaft pinion gear and the deceleration gear, having a contact portion composed of a synthetic resin.

5 Claims, 17 Drawing Sheets

U.S. PATENT DOCUMENTS

| | | | |
|---|---|---|---|
| 5,033,566 A * | 7/1991 | Moretti et al. | 180/445 |
| 5,497,548 A | 3/1996 | Schlenger et al. | 29/893 |
| 5,979,260 A | 11/1999 | Long et al. | 74/440 |
| 6,109,129 A | 8/2000 | Genter et al. | 74/440 |
| 6,129,171 A * | 10/2000 | Takaoka | 180/444 |
| 6,155,376 A * | 12/2000 | Cheng | 180/444 |
| 6,227,064 B1 * | 5/2001 | Nakamura | 74/388 PS |
| 6,390,230 B1 * | 5/2002 | Shimizu et al. | 180/444 |
| 6,454,044 B1 * | 9/2002 | Menjak et al. | 180/444 |
| 6,629,578 B2 * | 10/2003 | Saruwatari et al. | 180/444 |
| 2002/0112555 A1 * | 8/2002 | Chikaraishi et al. | 74/388 PS |

FOREIGN PATENT DOCUMENTS

| | | |
|---|---|---|
| EP | 1 016 581 | 7/2000 |
| JP | UM 2-116495 | 5/1990 |
| JP | UM 2-46455 | 12/1990 |
| JP | 3-15591 | 3/1991 |
| JP | UM 5-14939 | 4/1993 |
| JP | 6-504 | 1/1994 |
| JP | 6-49489 | 12/1994 |
| JP | 10-16799 | 1/1998 |
| JP | 3062852 | 5/2000 |
| JP | 2001116052 A * | 4/2001 |
| JP | 2002021980 A * | 1/2002 |
| JP | 2003028278 A * | 1/2003 |
| WO | WO98/38072 | 9/1998 |

OTHER PUBLICATIONS

SKF: "Walzlager", SKF GMBH, Germany, XP002293607, 1989 pp. 24-25.

Patent Abstracts of Japan, JP 61 191468, Aug. 26, 1986 (Abstract).

SKF: "Walzlager", SKF GMBH, Germany, XP002293607 1989, pp. 66-67.

* cited by examiner

ELECTRIC POWER STEERING APPARATUS

This application claims the benefit of Japanese Patent Applications No. 2001-115603, 2001-194825, 2002-057538 and 2002-060736.

BACKGROUND OF THE INVENTION

1. Field of the Invention

The present invention relates to an electric power steering apparatus for a vehicle. The present invention also relates to a power transmission gear suitable for use of the electric power steering apparatus.

2. Related Background Art

A steering apparatus for a vehicle has hitherto been classified into a manual type and a power assist type. The latter power assist type is designed to relieve the manual force by assisting the manual steering force with power taking some form. This power assist type steering apparatus is further classified into an electric type and a hydraulic type.

The former electric type is known as an electric power steering apparatus. Within this category, an electric power steering apparatus with a deceleration mechanism using a ball screw nut is disclosed in, e.g., Japanese Patent Application Post-Exam Publication No. 6-504. FIG. 19 illustrates a sectional configuration of this steering apparatus. Referring to FIG. 19, a first gear 21 is fixed to a rotary shaft of a motor 22. A second gear 32a formed integrally with a ball screw nut 32 meshes with the first gear 21. The ball screw nut 32 is rotatably supported by a housing 25 through bearings 28. A rack shaft 33 is internally fitted in the ball screw nut 32. The rack shaft 33 is formed with a helical groove 33b indirectly engaging through balls 26 with a helical groove 32b of the nut 32. A rack 33a is formed on a left sided portion, as viewed in FIG. 19, of the helical groove 33b of the rack shaft 33, and meshes with a pinion gear 36 to which a rotation of a handle 35 is transferred via a steering shaft.

The ball screw type electric power steering apparatus in the prior art adopts the deceleration mechanism constructing by combining the gears with each other as the first gear 21, the second gear 32a and the ball screw nut 32 are combined, and therefore large operating noises emit due to sliding on a contact portion of a metal and so on. Especially in the case of the deceleration mechanism using the gears composed of steels, there exists a problem in which butting noises occur due to gaps between the teeth, and a driver of the vehicle might feel the noises uncomfortable.

SUMMARY OF THE INVENTION

It is an object of a first invention of the present application to provide an electric power steering apparatus capable of preventing emissions of large operating noises and butting noises by improving the inconveniences inherent in the prior arts described above.

To accomplish the above object, according to a first aspect of the first invention of the present application, an electric power steering apparatus comprises a rotary shaft member connected to a steering wheel and rotating together with the steering wheel, an elongate member capable of making a rectilinear motion in either of opposite directions in order to steer dirigible wheels, a rack-and-pinion mechanism connected drivewise to the rotary shaft member and the elongate member and constructed of a pinion gear rotated by the rotary shaft member and of a rack gear provided in a first axial position of the elongate member and meshing with the pinion gear, a ball screw mechanism constructed of a screw member provided in a second axial position of the elongate member, a nut member surrounding at least a part of the screw member and a multiplicity of balls interposed between the screw member and the nut member, an electric motor unit disposed with its axis different from that of the elongate member, and a meshing type rotation decelerating mechanism including at least two pieces of meshing components in order to decelerate rotations of an output shaft of the electric motor unit and to transfer the decelerated rotations to the nut member of the ball screw mechanism, wherein a contact portion, with the other component, of at least the one component of the components of the rotation decelerating mechanism, is composed of a synthetic resin.

In the electric power steering apparatus according to the first aspect of the first invention, the resin of at least the one component of the components of the rotation decelerating mechanism, is joined by bonding chemically based on a metal-plastic composite making technology or by bonding of a bonding agent.

In the electric power steering apparatus according to the first aspect of the first invention, a meshing contact surface of the synthetic resin is formed as an easy-to-slide smooth surface.

An electric power steering apparatus according to a second aspect of the first invention, comprises a rotary shaft member connected to a steering wheel and rotating together with the steering wheel, an elongate member capable of making a rectilinear motion in either of opposite directions in order to steer dirigible wheels, a rack-and-pinion mechanism connected drivewise to the rotary shaft member and the elongate member and constructed of a pinion gear rotated by the rotary shaft member and of a rack gear provided in a first axial position of the elongate member and meshing with the pinion gear, a ball screw mechanism constructed of a screw member provided in a second axial position of the elongate member, a nut member surrounding at least a part of the screw member and a multiplicity of balls interposed between the screw member and the nut member, an electric motor unit disposed with its axis different from that of the elongate member, and a meshing type rotation decelerating mechanism including three two pieces of meshing components in order to decelerate rotation of an output shaft of the electric motor unit and to transfer the decelerated rotation to the nut member of the ball screw mechanism, wherein a contact portion, with the other component, of the intermediate (tangent to the two other gears at the same time) of the components of the rotation decelerating mechanism, is composed of a synthetic resin.

In the electric power steering apparatus according to the second aspect of the first invention, the synthetic resin of the intermediate component is joined by chemical bonding based on a metal-plastic composite making technology or by bonding of a bonding agent.

With the configuration described above, the synthetic resin absorbs oscillations when the two pieces of meshing components are brought into contact with each other, and the oscillations are restrained owing to a high slidability of the surface thereof. Therefore, the emissions of the operating noises when driving the rotation decelerating mechanism and of the butting noises due to the gaps between these components, can be prevented.

It is an object of a second invention of the present application to provide a rack assist type electric power steering apparatus constructed to ensure a rigidity and prevent noises in a power transmission system.

An electric power steering apparatus according to the second invention comprises an electric motor, a ball screw mechanism connected to the electric motor via a gear train containing an idler gear and used for driving a rack shaft, and a steering gear case incorporating the rack shaft and the ball screw mechanism, wherein the idler gear is rotatably supported by an idler gear shaft fixed at its two side ends to the steering gear case, and a couple of bearings pre-loaded by pre-loading members is interposed between the idler gear shaft and the idler gear.

According to the second invention, the idler gear is supported at two points with respect to the steering gear case, thereby preventing the idler gear from falling down due to a steering reactive force. Moreover, the bearing is preloaded by the pre-loading members, whereby a supporting rigidity of the idler gear enhances, and a backlash and noises of the idler gear become hard to occur when reversely rotated in steering.

In the electric power steering apparatus according to the second invention, it is preferable that the idler gear is a helical gear or a double helical gear.

As illustrated in FIG. 10, in the related rack assist type EPS apparatus, an axis C2 of an idler gear 38 deviates by a predetermined dimension 1 from a plane S' containing an axis C1 of a gear 37 on the side of an electric motor 35 and an axis C3 of a gear 39 on the side of a ball nut 41. The reason is that the electric motor 35 and the ball nut 41 are made closer in order to downsize the EPS apparatus with the result that an inconvenience occurs when the EPS apparatus operates. To be specific, the idler gear 38 is, when the respective gears 37, 38, 39 are rotated in direction indicated by arrowheads in FIG. 10, biased in such a direction as to be caught in between other gears 37 and 39. Therefore, each time there occurs a reversal rotating operation of the EPS apparatus which follows the reversal rotation in steering, the idler gear 38 moves corresponding to the backlash of a rolling bearing that rotationally supports the idler 38, and the backlash between the other gears 37 and 39 alternately changes, thereby causing uncomfortable driving noises.

It is an object of a third invention of the present application to provide an electric power steering apparatus constructed to restrain the operating noises due to the change in the backlash when making the reversal rotating operation.

An electric power steering apparatus according to the third invention comprises a ball nut rotationally driven by an electric motor through a gear train containing an idler gear and having a female thread groove formed in its inner periphery, a rack shaft disposed on an axis of the ball nut and having a male thread groove so formed in its outer periphery as to face to the female thread groove, and a plurality of circulation balls interposed between the female thread groove and the male thread groove, wherein an axis of the electric motor, an axis of the idler gear and an axis of the ball nut, are disposed substantially on the same plane.

According to the third invention, the idler gear does not take such a form as to be caught in between the other gears also when performing the rotating operation in any direction in the EPS apparatus, and the noises due to the change in the backlash are not emitted.

Further, according to the rack assist type EPS apparatus, the male thread grove of the ball screw shaft that is formed in the rack shaft engages with the female thread groove formed in the ball nut through the multiplicity of circulation balls (steel balls), and the electric motor rotationally drives the ball nut, whereby the rack shaft moves in the axial direction. A method of transmitting the power between the electric motor and the ball nut is exemplified such as a timing belt system disclosed in Japanese Utility Model Post-Exam Publication No. 6-49489, however, what is general is a gear system disclosed in each of Japanese Patent No. 3062852, Japanese Utility Model Post-Exam Publication No. 5-14939 and Japanese Utility Model Post-Exam Publication No. 2-46455. According to the rack assist type EPS apparatus taking the power transmission method based on the gear system, an idler gear is normally interposed between the gear on the side of the electric motor and the gear on the side of the ball nut in order to avoid these two gears from having large diameters.

In the rack assist type EPS apparatus described above, the helical gear and the spur gears are used as the gears of the gear train for the power transmission. As known well, a proper backlash is required to be provided between the gears meshing with each other for smoothly operating these gears. In the case of the EPS apparatus, however, a rotating direction of the gear is changed with a reverse rotation in steering. Hence, if a driver gives a minute steering angle in forward and reverse directions as in rectilinear traveling etc, a problem occurs in that rattles (gear butting noises) are emitted. This problem is derived from the fact that the gears are rotated repeatedly in the forward and reverse directions at a comparatively short interval, and a tooth surface of the gear loosely moving by the backlash impinges on a tooth surface of the gear to be meshed with.

There have hitherto existed the scissors gears of the types disclosed in Japanese Patent Application Laid-Open No. 2-116495 and others as a technology of restraining the butting noises of the spur gears. The scissors gear is structured such that the spur gears are divided by half in the axial directions, the spur gears divided by half are biased in relative rotating directions by a tensile coil spring or compression coil spring, and teeth of the two pieces of spur gears seize and hold by pressure teeth of an opposite gear, thus preventing a collision occurred by a loose movement. This type of scissors gear, however, requires two through four pieces of tensile coil springs or compression coil springs, and, in addition, the two spur gears need installing spaces (or storage spaces) for the tensile coils springs or compression coil springs and engaging pins as well. This leads to increases in the number of components and the number of assembling steps, and it is inevitable that the structure and the gear configuration become complicated.

It is an object of fourth invention, which were devised under such circumstances, to provide a scissors gear capable of effectively restraining gear butting noises with a comparatively simple configuration adopted and an electric power steering apparatus using this scissors gear.

According to an aspect of the fourth invention, a scissors gear constituting a part of a gear train and seizing and holding by pressure teeth of a gear meshing therewith in order to restrain gear butting noises, comprises a first cylindrical gear whose tooth trace is parallel to an axis thereof;

a second cylindrical gear whose tooth trace is parallel with an axis thereof, the second gear being slidable in an axial direction with predetermined relative rotations and engageable with said first gear; and a biasing member for making said first gear and said second gear apart from or close to each other in the axial direction.

According to the fourth invention, the first and second gears get apart from or close to each other in the axial direction, thereby seizing and holding by pressure the teeth of the gear meshing with the scissors gear. An emission of the gear butting noises due to the loose movement is prevented.

According to a second aspect of the fourth invention, a scissors gear constituting a part of a gear train and seizing and holding by pressure teeth of a gear meshing therewith in order to restrain gear butting noises, comprises a first cylindrical gear whose tooth trace is not parallel with an axis thereof;

a second cylindrical gear whose tooth trace is not parallel with an axis thereof, the second gear being slidable in an axial direction; and a biasing member for making said first gear and said second gear apart from or close to each other in the axial direction.

With this configuration taken, the first and second gears get apart from or close to each other in the axial direction, thereby seizing and holding by pressure the teeth of the spur gear meshing with the scissors gear. The emission of the gear butting noises due to the loose movement is prevented.

Further, in the scissors gear according to the fourth invention, it is preferable that the biasing member is a compression coil spring.

According to this configuration, for instance, the compression coil spring is stretched on the axis between the first gear and the second gear, whereby the two gears are made apart from each other in the axial direction by one piece of compression coil spring.

According to a third aspect of the fourth invention, there is provided an electric power steering apparatus for providing a steering assist by transferring a driving force of an electric motor to a steering drive component through a gear train containing a scissors gear, the scissors gear comprising a first gear, a second gear so engaging with the first gear as to be slidable in an axial direction, and a biasing member for making the first gear and the second gear apart from or close to each other in the axial direction.

According to the third aspect of the fourth invention, the first and second gears get apart from or close to each other in the axial direction with relative rotations, thereby seizing and holding by pressure the teeth of the gear meshing with the scissors gear. The emission of the gear butting noises due to the loose movement is prevented.

In the fifth invention, the first and second gears may be, respectively, helical gears or spur gears.

DESCRIPTION OF THE PREFERRED EMBODIMENTS

Embodiments of the present inventions will hereinafter be described with reference to the accompanying drawings.

Figure 1:
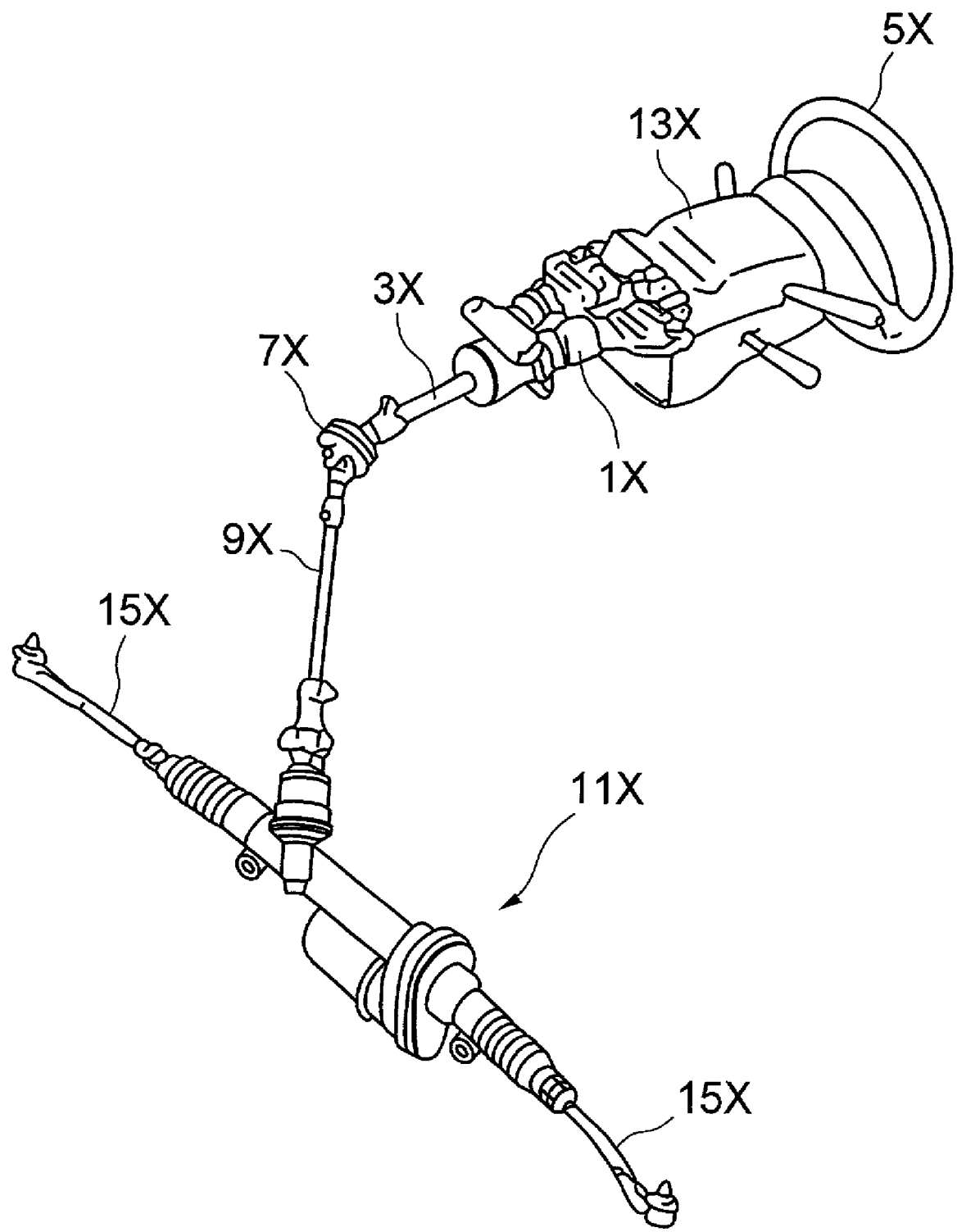
FIG. 1 is a perspective view illustrating car room sided components of a steering apparatus according to the present inventions.

FIG. 1 is a perspective view illustrating car-room-sided components of an electric power steering apparatus common to all the embodiments that will hereinafter be described. A member indicated by a symbol 1X in FIG. 1 is a steering column. the steering column 1X supports an upper steering shaft 3X rotatably. A steering wheel 5X is fitted to an upper side end of the upper steering shaft 3X on one hand, and a lower steering shaft 9X is connected via a universal joint 7X to a lower side end of the shaft 3X. A steering gear arrangement 11X constructed of a rack-and-pinion mechanism and a power assist mechanism is connected to a lower side end of the lower steering shaft 9X. Referring again to FIG. 1, the symbol 13X represents a column cover for covering the steering column 1X, and the symbols 15X indicate tie rods connected to left and right side ends of the steering gear 11X.

Figure 2:
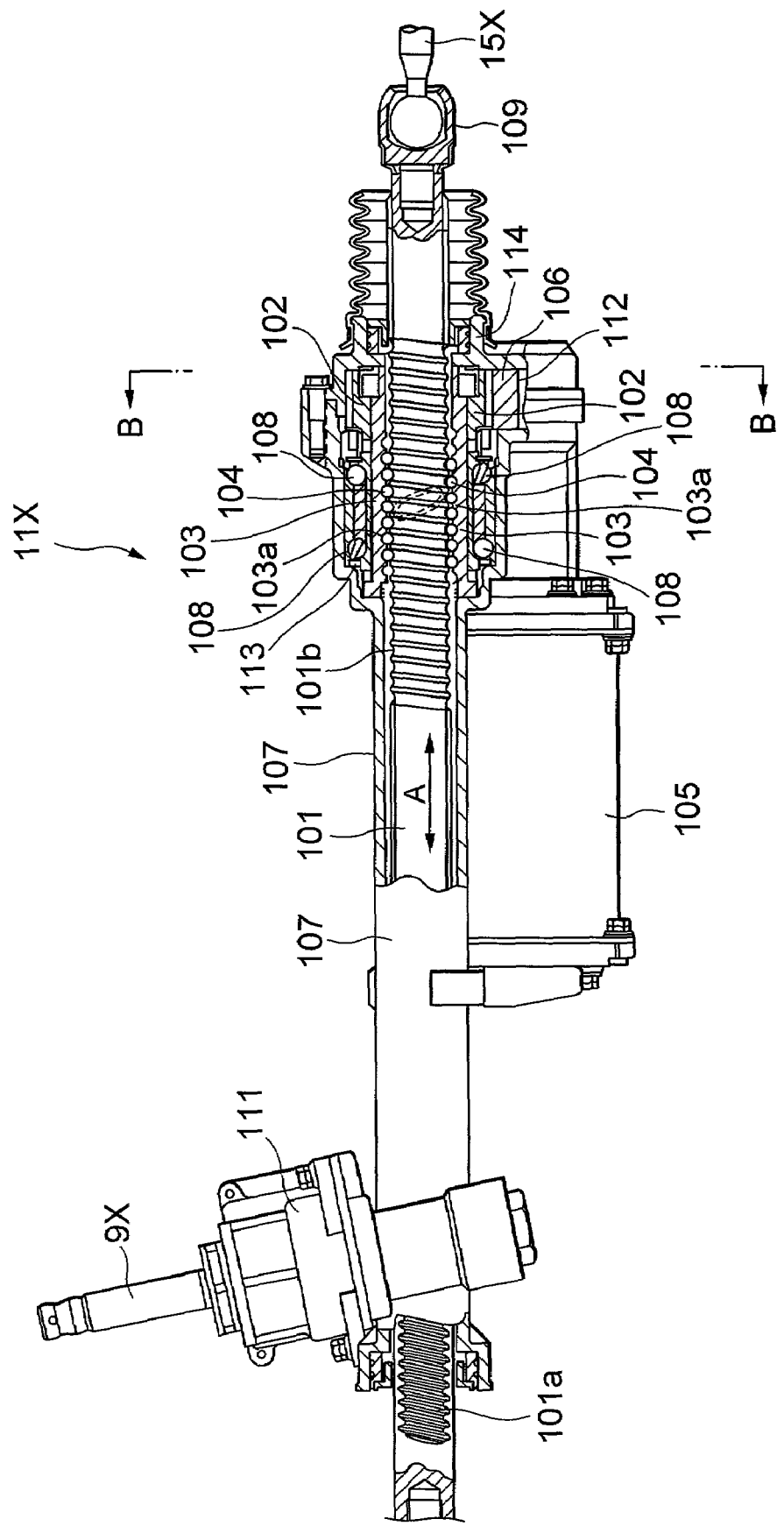
FIG. 2 is a sectional view showing a configuration of an electric power steering apparatus in a first embodiment of the first invention.
Figure 3:
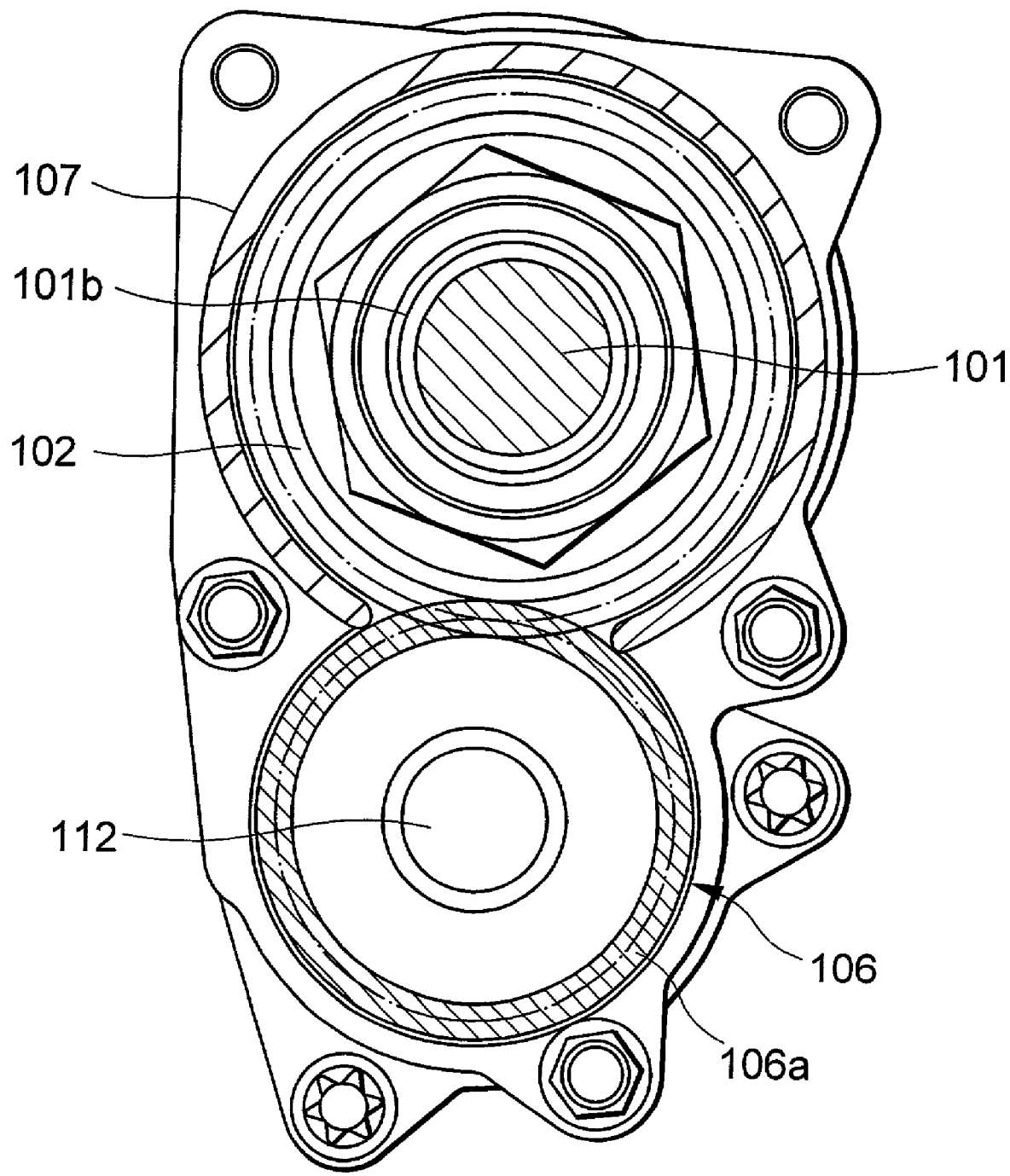
FIG. 3 is a sectional view taken along the line B-B in FIG. 2, showing a gear geometry of a rotation deceleration mechanism.
Figure 4:
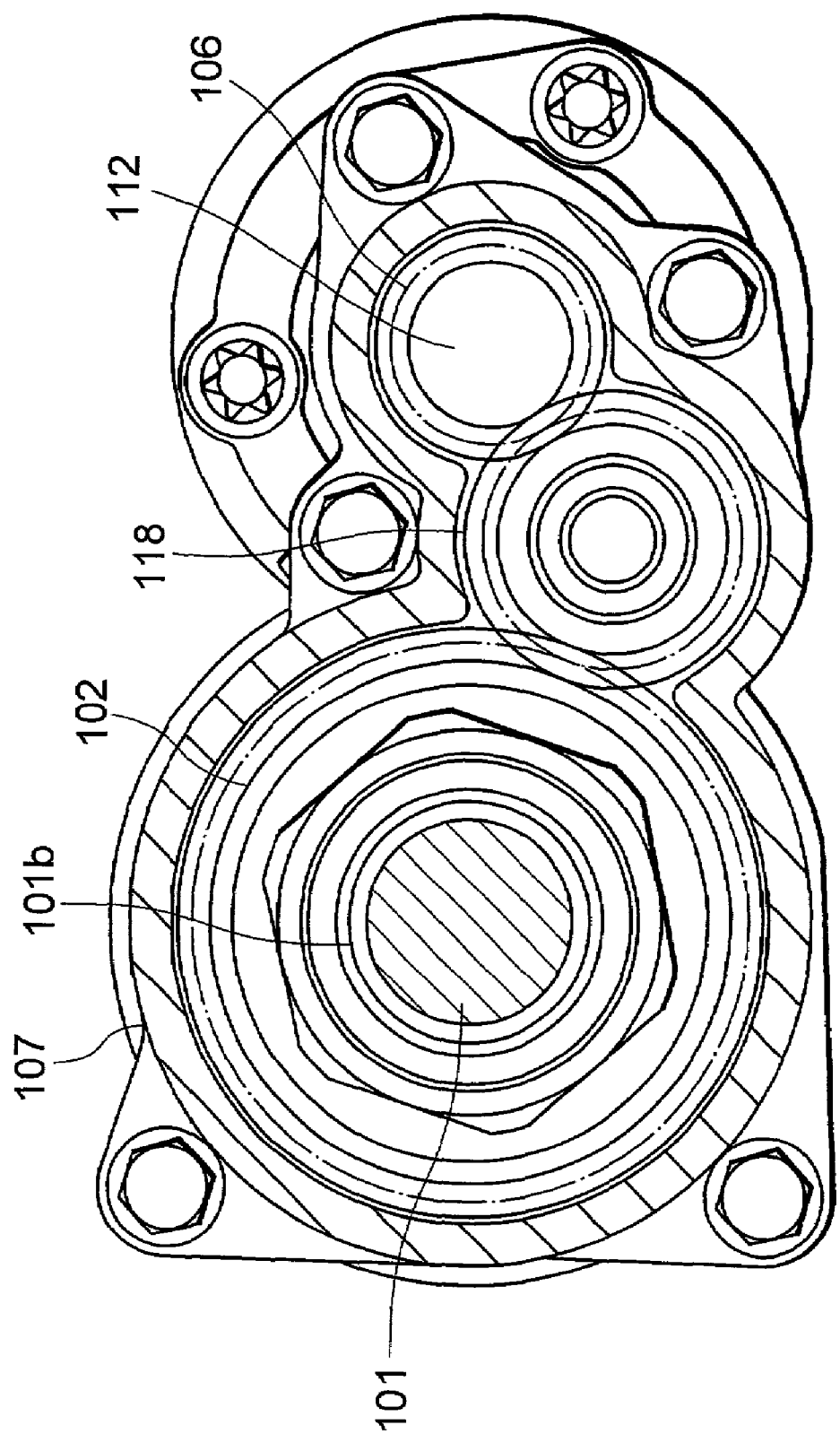
FIG. 4 is a vertical sectional view showing a gear geometry of the rotation deceleration mechanism in a second embodiment of the first invention.

FIG. 2 is a partial sectional view of a configuration of the electric power steering apparatus, showing a first embodiment of the first invention. FIG. 3 is a sectional view taken along the line B-B in FIG. 2, illustrating a gear geometry of a rotation decelerating mechanism. FIG. 4 is a vertical sectional view of a gear geometry of the rotation decelerating mechanism, showing a second embodiment of the first invention.

Referring to FIG. 2, a pinion gear 106 is fixed to a shaft 112 (see FIG. 3) separate from an output rotary shaft of a brushless electric motor 105 defined as an electric motor unit on the same axial line of this output shaft, and a deceleration gear 102 meshes with this pinion gear 106.

The deceleration gear 102 is externally fitted on and thus fixed to a nut-shaped ball screw nut 103 or formed integrally with this screw nut 103. The ball screw nut 103 is so supported as to be rotatable with respect to a housing 107 through bearings 108, 108 and a nut damper 113, and is, a rack shaft 101 being internally fitted therein, i.e., so provided as to encompass this rack shaft 101. The rack shaft 101 is formed with a helical groove 101b engaging indirectly with a helical groove 103a of the ball screw nut 103 through balls 104. Namely, this ball screw nut 103 indirectly engages with the rack shaft 101 through a multiplicity of spherical balls 104 rotatably fitted in between the helical groove 103a and the helical groove 101b, and the ball screw nut 103 is fitted on a part of the helical grooves 101b in the axial direction. The ball screw nut 103 and the balls 104 configure a known so-called ball screw or ball thread unit. The pinion gear 106, the deceleration gear 102 and the ball screw nut 103 configure a rotation deceleration mechanism. The helical groove 101b, the ball screw nut 103 and the balls 104 configure a ball screw mechanism. A rack stroke damper 114 is provided at one side end of the housing 107, and works to disperse an energy caused when the housing impinges on the ball joint at the rack end.

The electric motor 105 described above is constructed of a stator (unillustrated), a rotor (not shown) having a rotary shaft and others, and is disposed in a direction of the axis substantially parallel to the rack shaft 101 in this embodiment. The electric motor 105 may be disposed properly with a tilt corresponding to an installation space. One side end of the rack shaft 101 is connected to the tie rod 15X via the universal joint 109.

The rack shaft 101 has a rack 101a provided at, as viewed in the drawing, a left-sided portion (a front side end) of the helical groove 101a. This rack 101a meshes with a pinion gear (not shown) fixedly fitted on a pinion shaft 110 connected to a lower side end of a steering shaft (unillustrated) connected to a steering wheel, and built in a pinion gear box 111. The steering shaft and the pinion shaft 110 configure a rotary shaft mechanism, and the rack 101a and the pinion gear configure a rack-and-pinion mechanism. The rack-and-pinion mechanism itself is a known mechanism that connects drivewise the rotary shaft mechanism to the rack shaft 1.

A whole gear portion or a gear surface of the pinion gear 106 fixed to the rotary shaft of the electric motor 105, is composed of a synthetic resin 106a (drawn by hatching). The synthetic resin 106a has a predetermined elasticity, and a gear surface thereof is formed as a smooth surface that is easy to slide on.

If the pinion gear 106 is structured such that only the gear surface 106a is composed of the synthetic resin and the core is composed of a metal, the synthetic resin 106a is joined to a core gear surface by a metal-plastic composite technology, for instance, as by TRI Composite Technology by Toa Denka and Tohno Seimitsu Co. Inc., wherein the gear with the whole gear surface composed of the resin 106a is formed at a stage of completing this compositing and finished by a mechanical work using a hob cutter thereafter.

The TRI Composite Technology is a technology of joining plastic to a metal such as an aluminum alloy, a copper alloy etc within the metal mold by chemical coupling or by bonding chemically, which involves applying an electrochemical special metal surface treatment and insert injection molding. This technology provides firm joining without using any adhesive or bonding agent and is therefore capable of designing minute parts.

A first step of joining the core metal to the resin 106a by this TRI composite making process is to execute an organic plating treatment of the tooth surface (an entire surface of outer periphery) of the core metal and to cause chemical reaction in an interior just under the tooth surface. Next, this core metal is fitted into an injection metal mold, a molten resin is injected into the same metal mold, and the insert molding is then carried out, thereby bonding chemically the resin 106a to the gear surface of the core metal.

An operation in the configuration described above will briefly be explained. The electric motor 105 is controlled based on information such as a torque applied to the steering wheel by the driver or a car speed etc, however, a detailed explanation of a control circuit thereof is not related directly to the present invention and is therefore omitted herein. The control device controls an output of the electric motor 105 to acquire a proper assisting force corresponding to the detected torque and car speed.

Oscillations occurred when the pinion gear 106 of the electric motor 105 engages with the deceleration gear 102, are absorbed by the elasticity of the synthetic resin 106a and restrained by a high slidability of the smooth surface. Therefore, operation noises due to gear meshing are not emitted, and gear butting noises in gaps between the teeth are sufficiently prevented.

The rotary shaft of the electric motor 105 is joined to the shaft of the pinion gear 106. In this case, the rotations of the pinion gear 106 are transferred to the ball screw nut 103 via the deceleration gear 102, thereby rotating the ball screw nut 103. These rotations of the ball screw nut 103 drive the rack shaft 101 in any one of directions indicated by arrowheads A, thus steering the dirigible wheels. A torque of the steering shaft that corresponds to a load received by the rack shaft 101 on this occasion and a car speed are detected. The output of the electric motor 105 is controlled corresponding to detection values thereof, whereby an electric assisting force is properly added to the manual steering force.

Note that only the gear portion of the pinion gear 106 is composed of the synthetic resin in the first embodiment, however, the present invention is not limited to this structure, the gear portion of only the deceleration gear 102 meshing with the pinion gear 106 or the gear portions of both of these gears may also be composed of the synthetic resins. In short, a desired effect can by expected on condition that at least the gear portion, meshing with the other gear, of at least one of the gears of the rotation decelerating mechanism, be formed of the synthetic resin.

Next, a second embodiment of the first invention will be described referring to FIG. 4. A different point of the second embodiment from the first embodiment discussed above is that the rotation decelerating mechanism for transferring the rotations of the output pinion gear 106 of the electric motor unit 105 to the nut-shaped ball screw nut 103 is constructed of the two components, i.e., the pinion gear 106 and the deceleration gear 102 engaging this gear 106 in the first embodiment, and, by contrast, the rotation decelerating mechanism is constructed of three components, i.e., the pinion gear 106, the deceleration gear 102 and an intermediate gear 118 interposed therebetween in the second embodiment. Accordingly, the same components as those in the first embodiment are marked with the same symbols in FIG. 4, and their repetitive explanations are omitted.

According to the second embodiment, all or any two of the three components configuring the rotation decelerating mechanism may be composed of the synthetic resins, however, preferably the whole or the gear surface of the intermediate component, i.e., the intermediate gear 118 may be composed of the synthetic resin. If only the gear surface is composed of the synthetic resin, it is preferable to adopt the TRI joining as in the first embodiment. As explained above, if only the intermediate component among the three components is composed of the synthetic resin, it is possible to reduce the gear noises such as the butting noises, the operation noises and so on at a low cost. Further, when adopting the TRI joining as in the first and second embodiments, the resinous gear obtained has an more improved rigidity than the resinous gear in the prior art, and therefore can decrease its own outside diameter. Hence, it is feasible to decrease an inter-axis distance between the electric motor 5 and the elongate member, i.e., the rack shaft 101.

According to the first invention, the contact portion, with other component, of at least one of the meshing components of the rotation decelerating mechanism is composed of the synthetic resin. Therefore, the oscillations occurred when meshing with each other are absorbed by the resin and restrained by the high slidability, and it is possible to sufficiently prevent the emission of the operation noises and the emission of the butting noises caused in the gaps between the meshing components.

An embodiment of a second invention will hereinafter be discussed with reference to the accompanying drawings.

Figure 5:
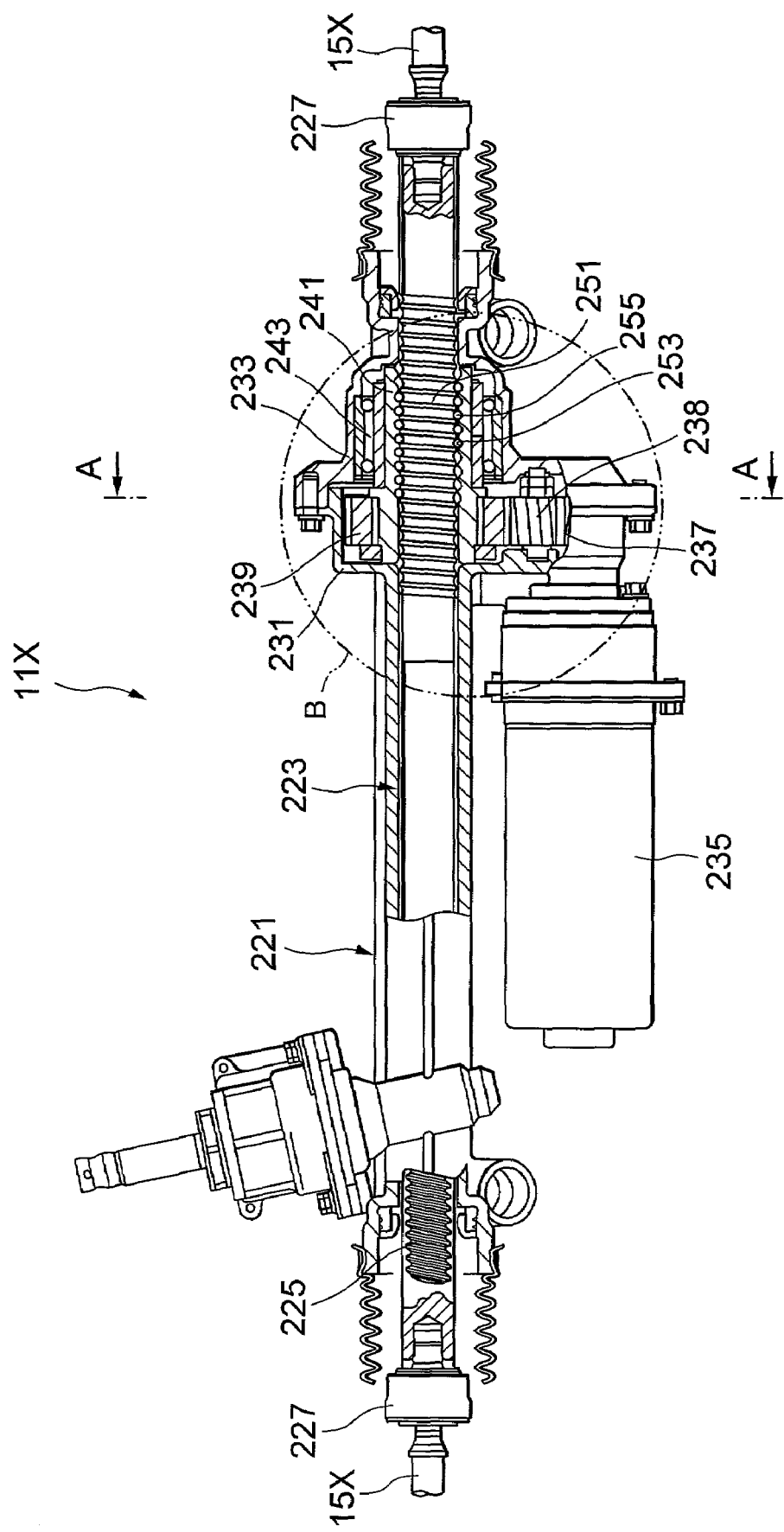
FIG. 5 is a vertical sectional view showing principal components of a steering gear in an embodiment of a second invention.
Figure 6:
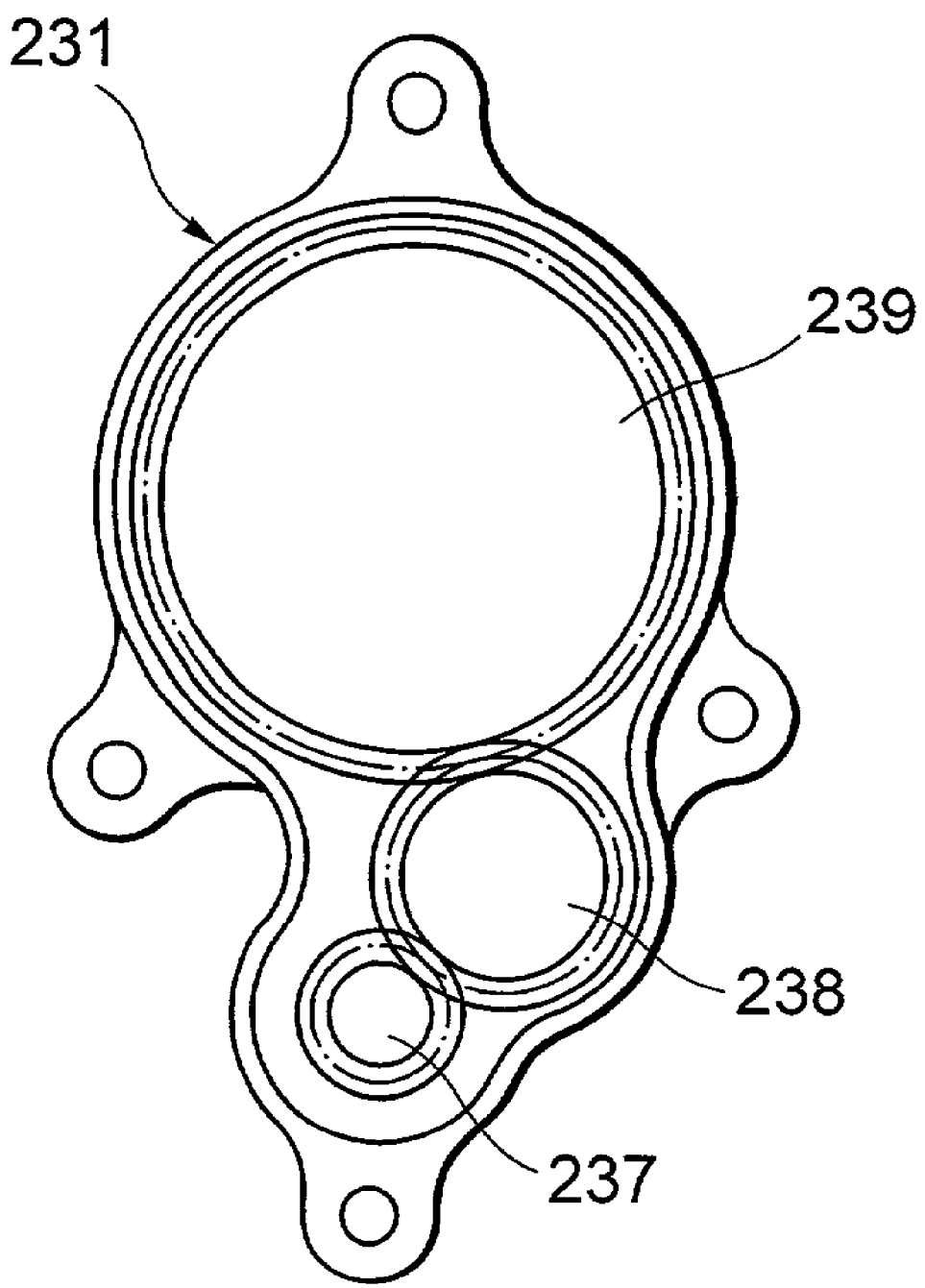
FIG. 6 is a sectional view taken along the line A-A in FIG. 5.
Figure 7:
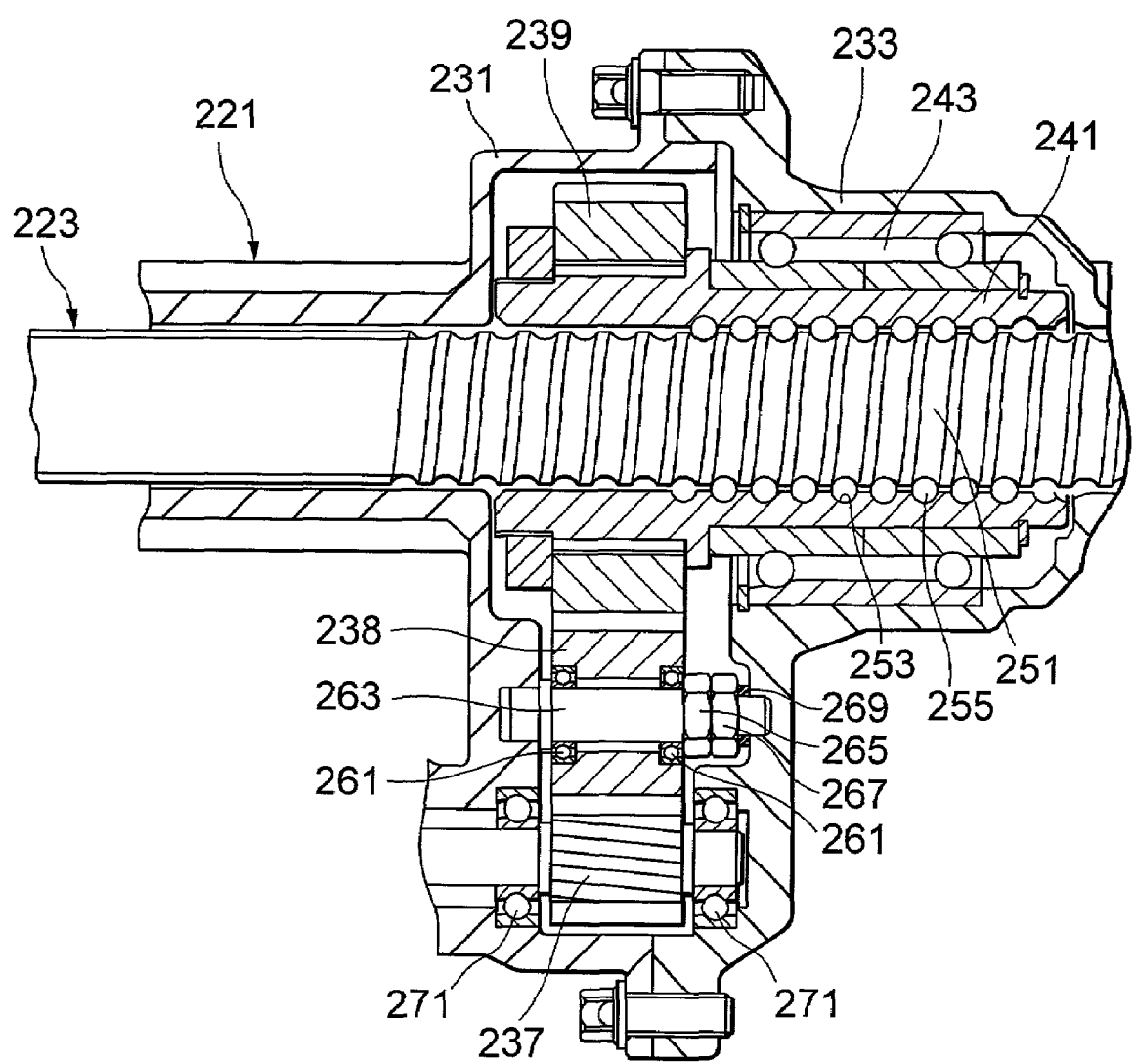
FIG. 7 is an enlarge sectional view of a portion B in FIG. 5.

FIG. 5 is a vertical sectional view showing principal portions of the steering gear 11X of the electric power steering apparatus in an embodiment of the second invention. FIG. 6 is a sectional view taken along the line A-A in FIG. 5. FIG. 7 is an enlarged sectional view of a portion B in FIG. 5. A member indicated by the numeral 221 in FIG. 5 is a rack-and-pinion housing configuring a steering gear case. The rack-and-pinion housing 221 holds a rack shaft 223 and a pinion (not shown) constituting a rack-and-pinion mechanism. The rack shaft 223 has a rack 225 provided on the left side in FIG. 5 and meshing with the pinion, and spherical joints 227 for supporting tie rods 15X in a way that permits the tie rods 15X to oscillate, are fixed to the left and right side ends of the rack shaft 223.

A power assist mechanism has its shell constructed of a gear housing 231 formed at a right side end, as viewed in FIG. 5, of the rack-and-pinion housing 221 and of a ball screw housing 233 fastened to the gear housing 231 by bolts and configuring the steering gear case incorporation with the rack-and-pinion housing 221. A front side end of an electric motor 235 is fastened by bolts to a lower portion of the gear housing 231. Further, a drive gear 237 fixed to a motor shaft (unillustrated) of the electric motor 235 and a driven gear 239 meshing with the drive gear 237 through an idler gear 238, are housed between the gear housing 213 and the ball screw housing 233. Then, a ball nut 241 with its outer periphery to which the driven gear 239 is spline-fitted, is rotatably held through double-row angular ball bearings 243 in the ball screw housing 233. According to the second embodiment, the respective gears 237 through 239 are classified as helical gears.

The rack shaft 223 is formed with a male thread groove 251, while the ball nut 241 is formed with a female thread groove 253. A multiplicity of steel balls 225 defined as circulation balls are interposed between the male thread groove 251 and the female thread groove 253. Further, the ball nut 241 is fitted-with circulation pieces (unillustrated) for circulating the steel balls 255.

As shown in FIG. 7, the idler gear 238 is rotatably supported on an idler gear shaft 263 fixed to the gear housing 231 and the ball screw housing 233 through a couple of bearings (both of which are deep groove ball bearings in the second embodiment) 261. The two bearings 261 are disposed inside the idler gear 238 in the axial direction and pre-loaded by a couple of nuts (double nuts) 265, 267. A member designated by the numeral 269 in the drawing is a shim interposed between the nut 267 and the ball screw housing 233, and a member indicated by the numeral 271 is a bearing for supporting the drive gear 237.

An operation in the second embodiment will hereinafter be described.

When the driver rotates the steering wheel 5X (see FIG. 1), a rotating force thereof is transferred to the steering gear 11X via the upper steering shaft 3X and the lower steering shaft 9X. The steering gear arrangement 11X has a built-in rack-and-pinion mechanism for converting the rotational input into a rectilinear motion, and hence the rack shaft 223 moves in any one of the right and left directions, whereby the steering is performed with a change of an steering angle of the wheel through the right and left tie rods 15X. On this occasion, within the power assist mechanism, the electric motor 235 rotates with a predetermined rotational torque in any one of forward and reverse directions on the basis of an output of an unillustrated steering torque sensor, and the rotations of the electric motor 235 are decelerated and thus transferred to the ball but 241 via the idler gear 238 and the driven gear 239. When the ball nut 241 rotates, a thrust acts on the male thread groove 251 of the rack shaft 223 through the steel balls 255 engaging with the female thread groove 253, thereby actualizing the steering assist.

According to the second embodiment, the idler gear shaft 263 is supported at two points by the gear housing 231 and the ball screw housing 233, and therefore the idler gear 238 does not fall down by dint of a steering reactive force etc from the rack shaft 223. Further, the bearing 261 is pre-loaded, and hence almost no noise when reversely rotated in steering in combination with the gears 237 through 239 being the helical gears. Further, the bearings 261 are provided in the idler gear 238, thereby decreasing an inertia of the power transmission system due to a reduction in an inertial mass of the idler gear 238, preventing an interference between the bearings 261 and 271 and downsizing the gear housing 231 and the ball screw housing 233.

The discussion on the embodiment of the second invention comes to an end so far, however, the mode of the second invention is not limited to the embodiment described above. For instance, the idler gear and others are formed as the helical gears in the embodiment described above but may also be formed as spur gears and double helical gears. Moreover, the idler gear is supported on the idler gear shaft through the deep groove ball bearing in the embodiment described above, however, an angular ball bearing and a taper roller bearing may also be adopted. Furthermore, the whole configuration of the steering gear and the structure of the power assist mechanism, are not limited to the exemplifications given in the embodiment explained above and may be properly modified corresponding to requests in terms of designs and specifications if within the range that does not deviate from the concept of the present invention.

As discussed above, the electric power steering apparatus according to the second invention includes the electric motor, the ball screw mechanism connected to the electric motor via the gear train containing the idler gear and used for driving the rack shaft, and the steering gear case incorporating the rack shaft and the ball screw mechanism. In the thus constructed electric power steering apparatus, the idler gear is rotatably supported on the idler gear shaft fixed at its two side ends to the steering gear case, the couple of bearings pre-loaded by the pre-loading members are interposed between the idler gear shaft and the idler gear, whereby the idler gear is hard to fall down by dint of the steering reactive force, and a backlash and the noises are hard to occur when reversely rotated in steering.

Figure 8:
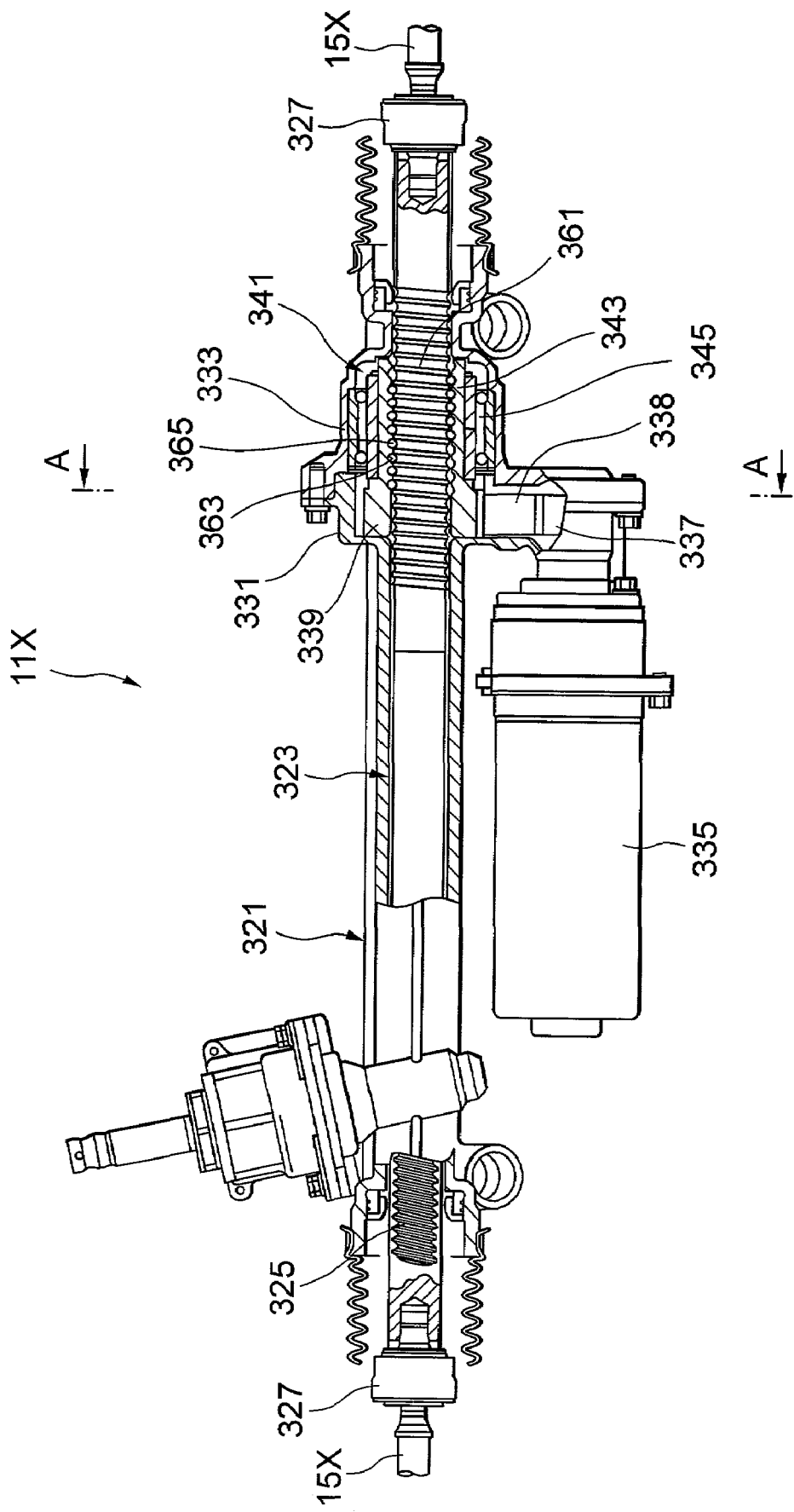
FIG. 8 is a sectional plan view showing principal components of the steering gear in a first embodiment of a third invention.
Figure 9:
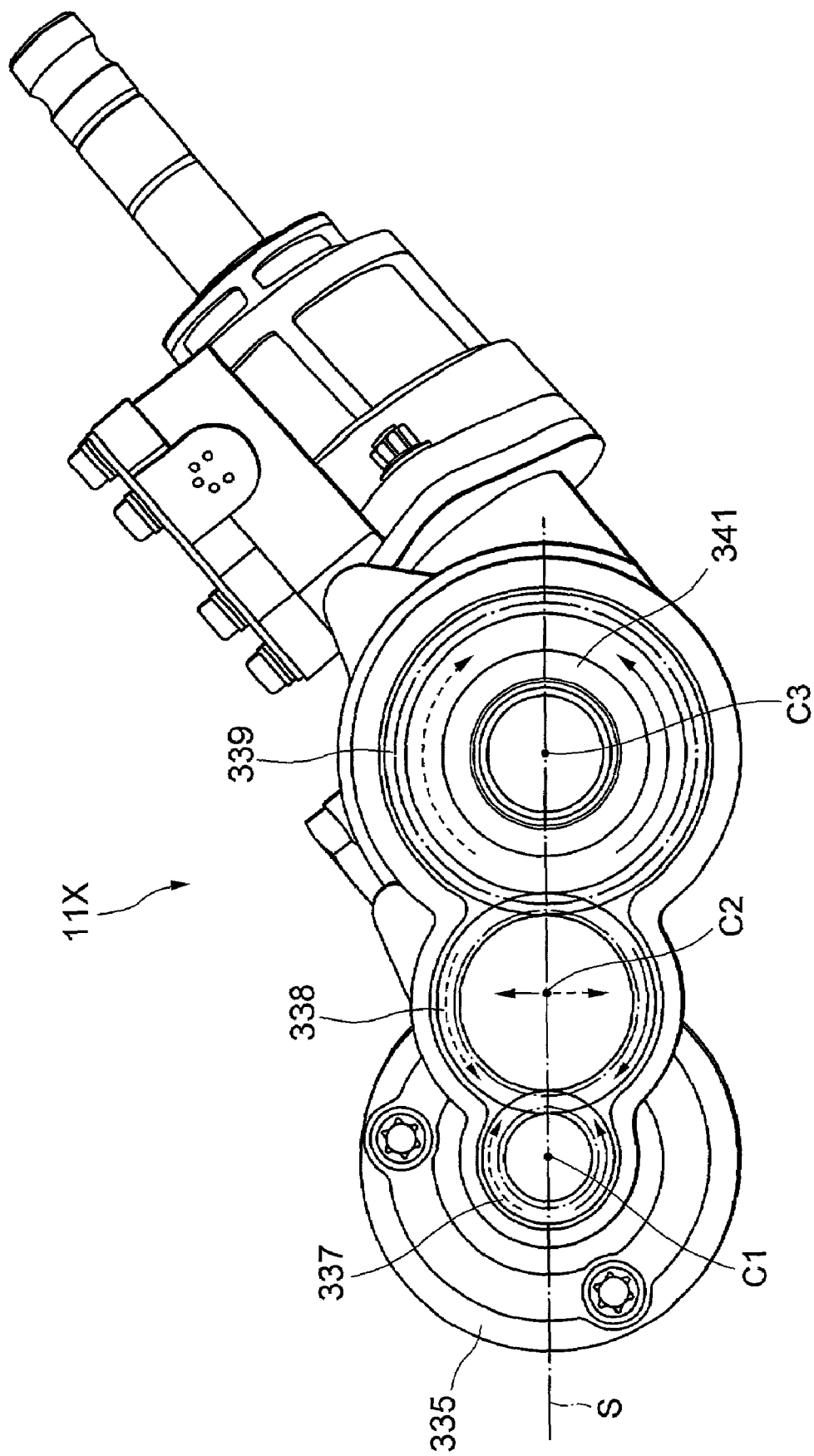
FIG. 9 is an enlarged sectional view taken along the line A-A in FIG. 8.
Figure 10:
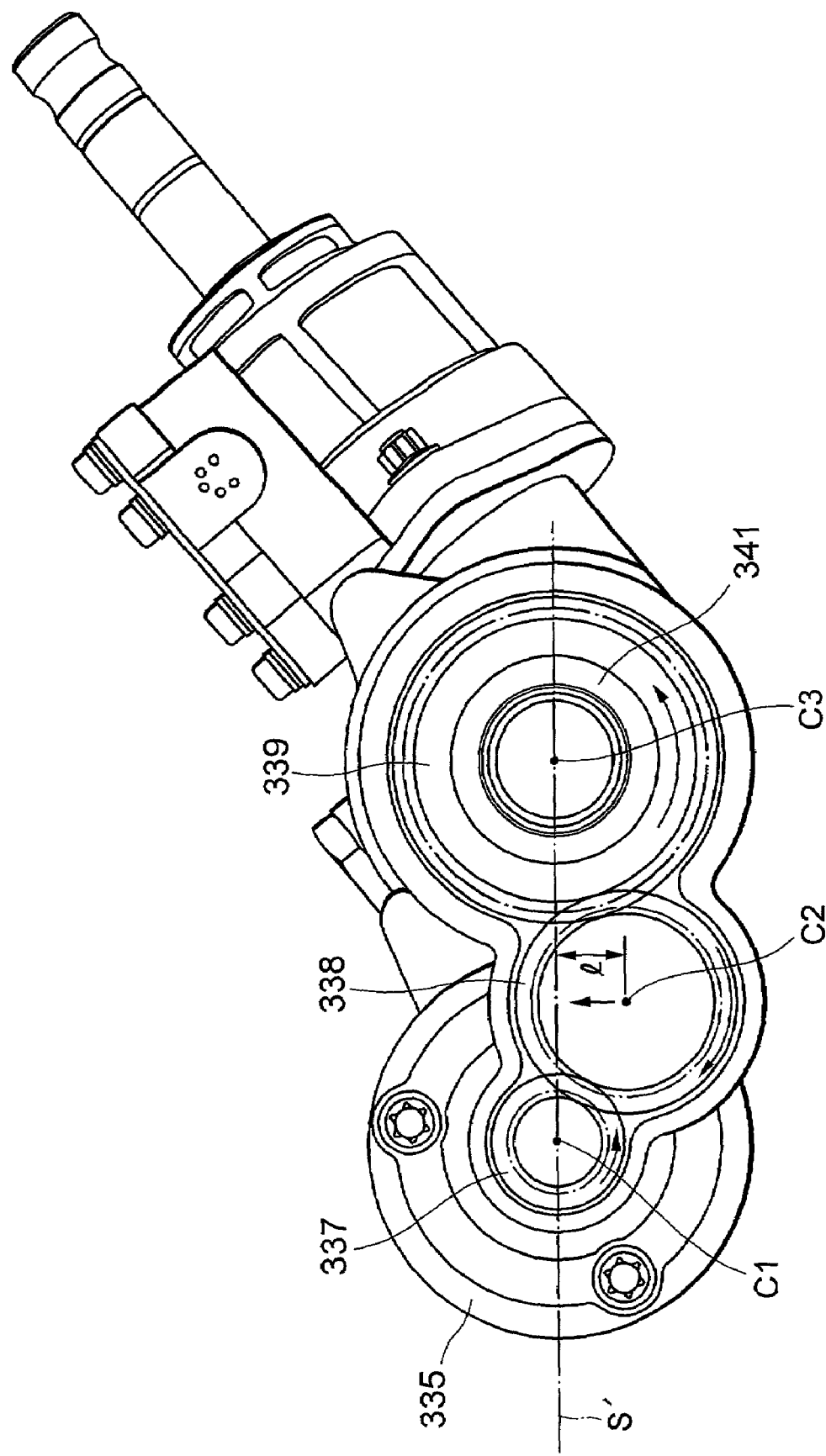
FIG. 10 is an explanatory view showing a gear geometry in a related apparatus.

FIG. 8 is a sectional plan view showing principal components of the steering gear 11X in the electric power steering (EPS) apparatus according to an embodiment of a third invention. FIG. 9 is an enlarged sectional view taken along the line A-A in FIG. 8. A member indicated by the numeral 321 in FIG. 8 is a rack-and-pinion housing configuring a steering gear case. The rack-and-pinion housing 321 holds a rack shaft 323 and a pinion (not shown) constituting a rack-and-pinion mechanism. The rack shaft 323 has a rack 325 provided on the left side in FIG. 8 and meshing with the pinion, and spherical joints 327 for supporting tie rods 315 in a way that permits the tie rods 15X to oscillate, are fixed to the left and right side ends of the rack shaft 323.

A power assist mechanism has its shell constructed of a gear housing 331 defined as a second housing formed at a left side end of the rack-and-pinion housing 321 and of a ball screw housing 333 defined as a first housing fastened to the gear housing 331 by bolts and configuring the steering gear case incorporation with the rack-and-pinion housing 321. An electric motor 335 is fastened by bolts to a lower portion of the gear housing 331.

A drive gear 337 fixed to a motor shaft (unillustrated) of the electric motor 335 and a driven gear 339 meshing with the drive gear 337 through an idler gear 338, are housed between the gear housing 313 and the ball screw housing 333. Further, a ball nut 341 with its side end provided with the driven gear 339 is rotatably held in the ball screw housing 333. The ball nut 341 is constructed of a ball nut body 343 and double-row angular ball bearings 345 fitted on the ball nut body 343.

The rack shaft 323 is formed with a male thread groove 361, while the ball nut body 343 is formed with a female thread groove 363. A multiplicity of steel balls 365 defined as circulation balls are interposed between the male thread groove 361 and the female thread groove 363. Further, the ball nut body 343 is fitted with circulation pieces (unillustrated) for circulating the steel balls 365.

As shown in FIG. 9, in the EPS apparatus in this embodiment, an axis C1 of the drive gear 337 (i.e., the electric motor 335), an axis C2 of the -idler gear 338 and an axis C3 of the driven gear 339 (i.e., the ball nut 341), are disposed on the same plane S.

An operation of this embodiment will hereinafter be explained.

When the driver steers the steering wheel 5X in any one of the right and left directions, the respective gears 337, 338, 339 are rotated in rotating directions indicated by arrowheads of solid lines in FIG. 9, and the idler gear 338 is biased upwards in FIG. 9. Further, when the driver steers the steering wheel 5X in the reversed direction, the respective gears 337, 338, 339 are rotated in rotating directions indicated by arrowheads of broken lines in FIG. 9, and the idler gear 338 is biased downwards in FIG. 9.

According to this embodiment, however, since the gears 337, 338, 339 are disposed on the same plane S, even if the idler gear 338 moves in upward or downward direction due to backlash of rolling bearings (unillustrated) that support rotatably the idler gear 338, the idler gear 338 is not caught into between the drive gear 337 and the driven gear 339. As a result, the backlashes between the idler gear 338, the drive gear 337 and the driven gear 339 do not change, with the result that the drive noises conceived as a problem in the prior art apparatus are not emitted.

The discussion on the embodiment of the third invention comes to an end so far, however, the mode of the third invention is not limited to the embodiment described above. The whole configuration of the steering gear arrangement and the structure of the power assist mechanism, may be properly modified corresponding to requests in terms of designs and specifications if within the range that does not deviate from the concept of the present invention.

As discussed above, the electric power steering apparatus according to the third invention includes the ball nut rotationally driven by the electric motor through the gear train containing the idler gear and having the female thread groove formed in its inner periphery, the rack shaft disposed on the axis of this ball nut and having the male thread groove so formed in its outer periphery as to face to the female thread groove, and the plurality of circulation balls interposed between the female thread groove and the male thread groove. In the thus constructed electric power steering apparatus, since the axis of the electric motor, the axis of the idler gear and the axis of the ball nut are disposed substantially on the same plane, the idler gear does not take such a form as to be caught in by other gears even when operated in the rotations in any one of directions in the EPS apparatus, and the noises caused due to the changes in the backlash are not emitted.

Figure 11:
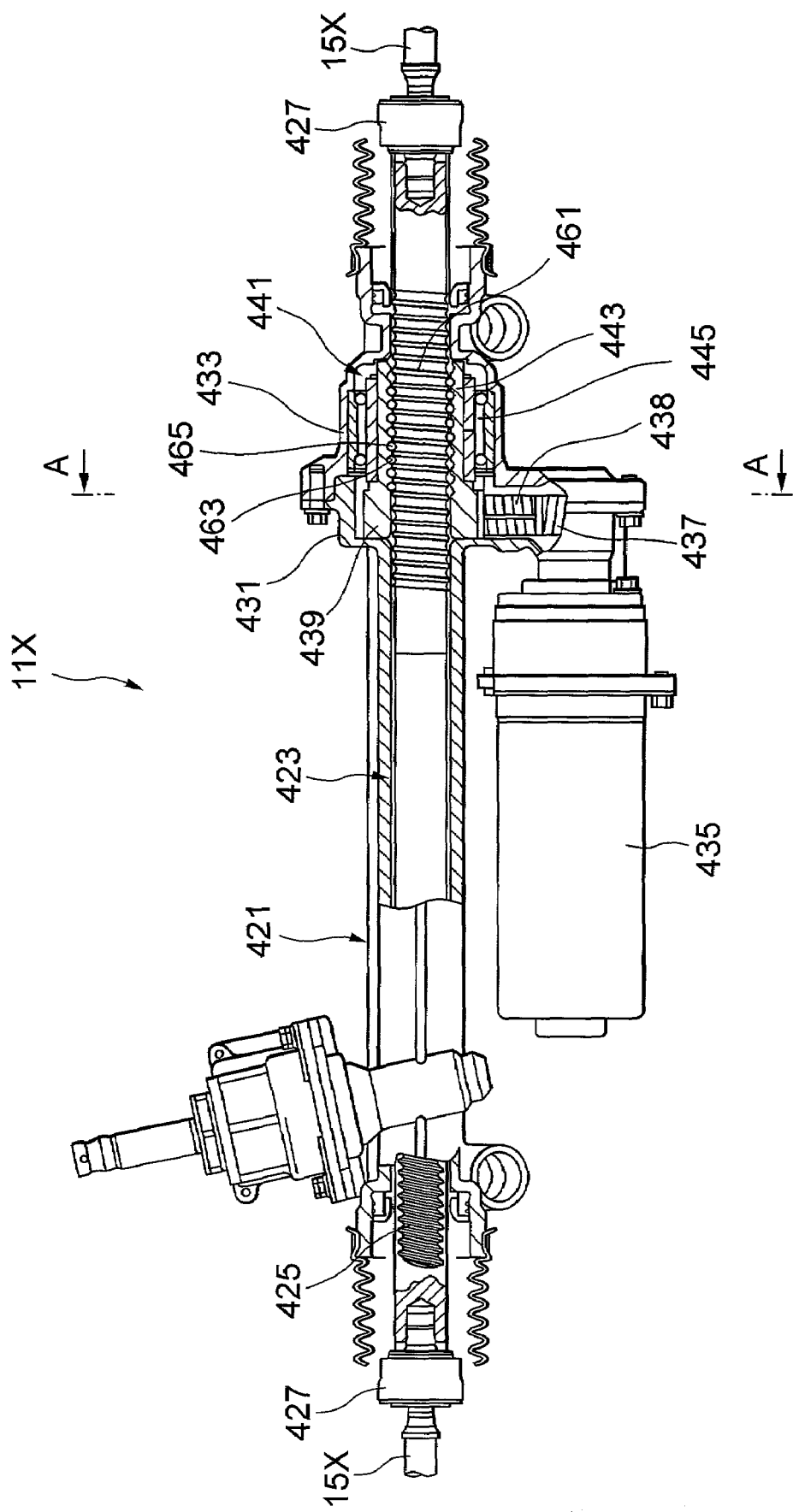
FIG. 11 is a sectional plan view showing principal components of the steering gear in a first embodiment of a fourth invention.
Figure 12:
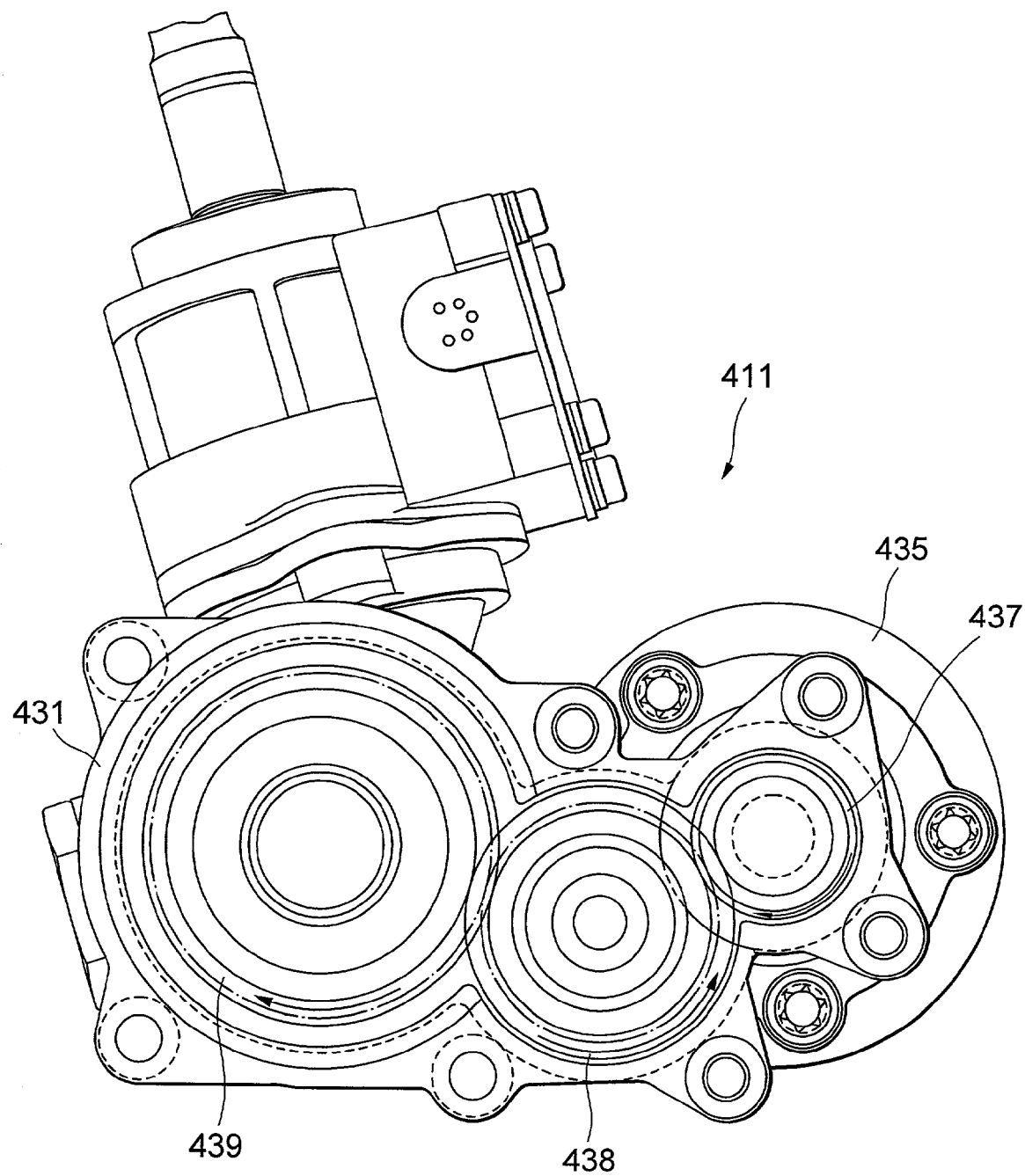
FIG. 12 is an enlarged sectional view taken along the line A-A in FIG. 11.

FIG. 11 is a sectional plan view showing principal components of the steering gear 11X in an electric power steering (EPS) apparatus in a first embodiment of a fourth invention. FIG. 12 is an enlarged sectional view taken along the line A-A in FIG. 11. A member indicated by the numeral 421 in these drawings is a rack-and-pinion housing configuring a steering gear case. The rack-and-pinion housing 421 holds a rack shaft 423 and a pinion (not shown) constituting a rack-and-pinion mechanism. The rack shaft 423 has a rack 425 provided on the left side in FIG. 11 and meshing with the pinion, and spherical joints 427 for supporting tie rods 15X in a way that permits the tie rods 15X to oscillate, are fixed to the left and right side ends of the rack shaft 423.

A power assist mechanism has its shell constructed of a gear housing 431 defined as a second housing formed at a right side end of the rack-and-pinion housing 421 and of a ball screw housing 433 defined as a first housing fixed to the gear housing 431 by bolts and configuring the steering gear case incorporation with the rack-and-pinion housing 421. An electric motor 435 is fixed by bolts to a lower portion of the gear housing 431. Note that the electric motor 435 is depicted downwards for an explanatory convenience in FIG. 11.

A drive gear 437 fixed to a motor shaft (unillustrated) of the electric motor 435 and a driven gear 439 meshing with the drive gear 437 through an idler gear 438 classified as a scissors gear, are housed between the gear housing 413 and the ball screw housing 433. In the case of this embodiment, the respective gears 437, 438, 439 are helical gears.

A ball nut 441 with its side end provided with the driven gear 439 is rotatably held in the ball screw housing 433. The ball nut 441 is constructed of a ball nut body 443 and a double-row angular ball bearing 445 fitted in the ball nut body 443.

The rack shaft 423 is formed with a male thread groove 461, while the ball nut body 443 is formed with a female thread groove 463. A multiplicity of steel balls 465 defined as circulation balls are interposed between the male thread groove 461 and the female thread groove 463. Further, the ball nut body 443 is fitted with circulation pieces (unillustrated) for circulating the steel balls 465.

Figure 13:
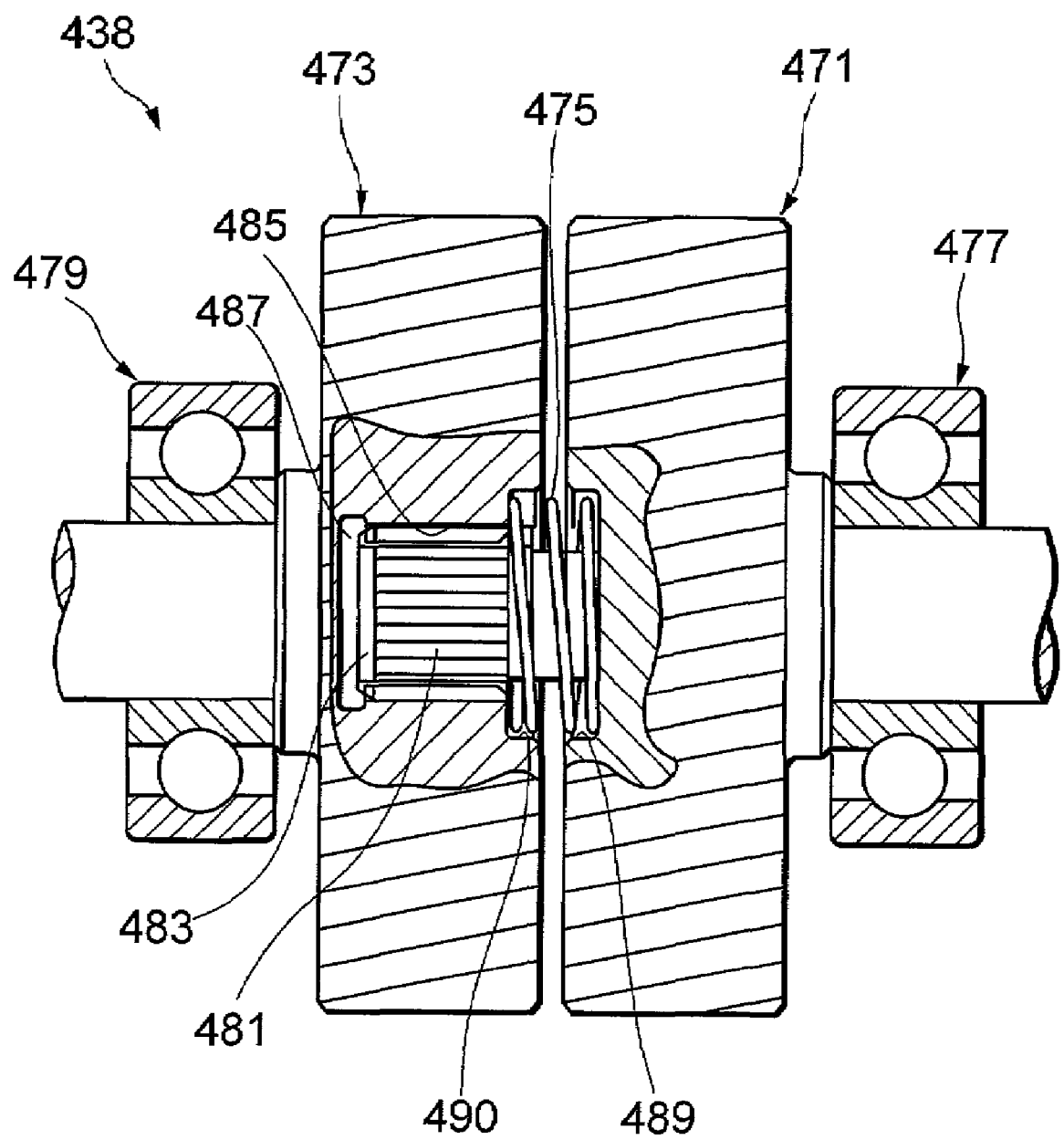
FIG. 13 is a sectional plan view showing principal components of an idler gear in the first embodiment of the fourth invention.

FIG. 13 is a sectional plan view illustrating principal components of the idler gear 438 classified as the scissors gear. As shown in FIG. 13, the idler gear 438 is constructed of a first helical gear 471, a second helical gear 473, and a compression coil spring 475 interposed between the two helical gears 471, 473. Referring to FIG. 13, the reference numerals 477, 479 represent rolling bearings (deep groove ball bearings) that rotatably support the first and second helical gears 471, 473.

A connecting shaft 483 having its outer peripheral surface formed with a male spline 481 is protruded from an inner side end surface of the first helical gear 471 on one hand, and a connecting hole 487 having its inner peripheral surface formed with a female spline 485 is bored in an axial core portion of the second helical gear 473 on the other hand. The male spline 481 engages with the female spline 485, whereby the first helical gear 471 and the second helical gear 473 are so connected to each other as to be slidable in the axial direction.

Annular recessed portions 489, 490 are formed in the inner side end surfaces of the first and second helical gears 471, 473, and the compression coil spring 475 described above is fitted and thus accommodated in these annular recessed portions 489, 490. In the case of this embodiment, the first and second helical gears 471, 473 are formed so that tooth traces thereof become coincident just when getting close to each other with a predetermined quantity from the state shown in FIG. 13. Further, when assembling, the idler gear 438 is made to mesh with the drive gear 437 and the driven gear 439 in the state where the first and second helical gears 471, 473 get close to each other resisting a spring force of the compression coil spring 475.

An operation of this embodiment will hereinafter be explained.

When the driver steers the steering wheel 5X in any one of the right and left directions, an unillustrated torque sensor detects a steering torque, whereby the electric motor 435 receives a drive current from an ECU (not shown) for the EPS apparatus and is thus actuated. The drive gear 437 fixed to the motor shaft of the electric motor 435 is thereby rotated, and, as indicated by the arrowheads in FIG. 12, a rotating force thereof is transferred to the driven gear 439 via the idler gear 438.

Figure 14:
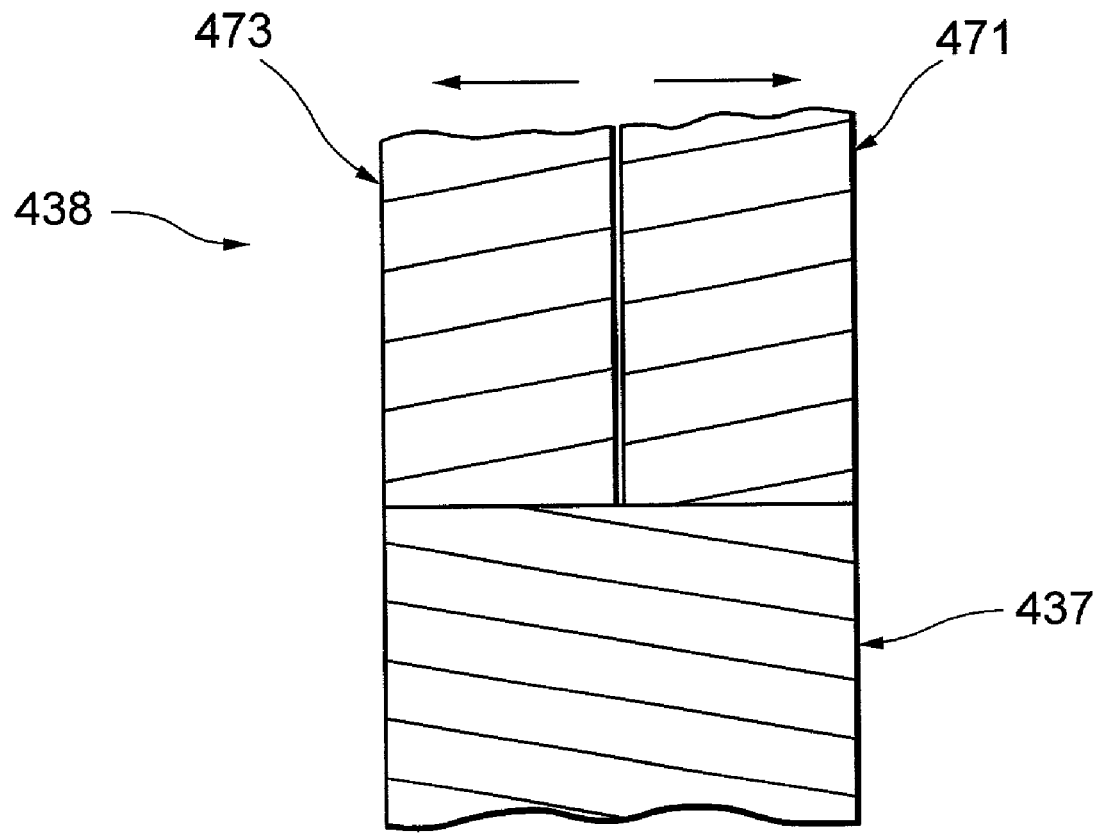
FIG. 14 is an explanatory view showing an operation in the first embodiment of the fourth invention.
Figure 15:
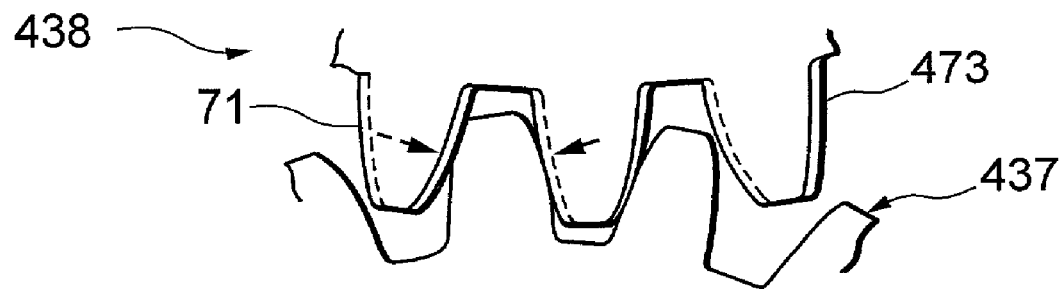
FIG. 15 is an explanatory view showing the operation in the first embodiment of the fourth invention.

Normally, the backlash exists between the teeth of the drive gear 437 and the teeth of the idler gear 438. According to this embodiment, however, the idler gear 438 is the scissors gear, and hence an emission of rattles (gear butting noises) attributed to this backlash is restrained. Namely, if a backlash b exists between the drive gear 437 and the first helical gear 471, when biased by the compression coil spring 475 as shown in FIG. 14, the first and second helical gears 471, 473 become apart from each other in the axial direction, and the teeth of the two helical gears 471, 473 seizure and hold by pressure the teeth of the drive gear 437.

With this configuration, it does not happen in this embodiment that the drive gear 437 loosely moves with respect to the idler gear 438 when reversely rotated in steering, and a silence when the EPS apparatus operates is remarkably improved. Note that the discussion made so far is related to the drive gear 437 and the idler gear 438, however, the same effect can be obtained with respect to the idler gear 438 and the driven gear 439 if the quantity of the backlash remains unchanged.

Figure 16:
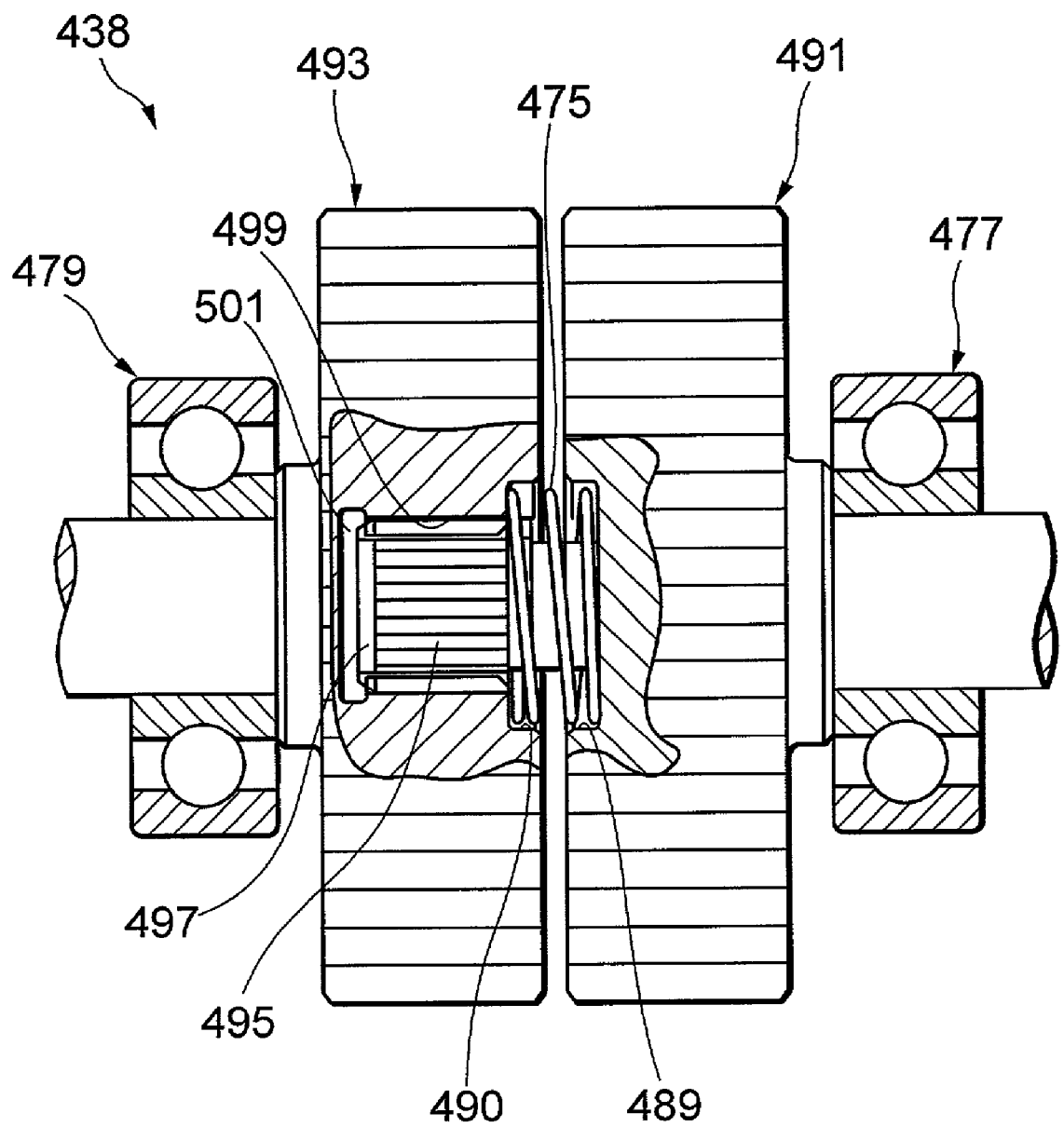
FIG. 16 is a sectional plan view showing principal components of the idler gear in a second embodiment of the fourth invention.

FIG. 16 is a sectional plan view showing the principal components of an idler gear 438 in a second embodiment of the fourth invention. As shown in FIG. 16, the idler gear 438 is constructed of a first spur gear 491, a second spur gear 493, and a compression coil spring 475 interposed between the two spur gears 491, 493. Referring to FIG. 16, the reference numerals 477, 479 represent rolling bearings (deep groove ball bearings) that rotatably support the first and second spur gears 491, 493.

A connecting shaft 497 having its outer peripheral surface formed with a male spline 495 is protruded from an inner side end surface of the first spur gear 491 on one hand, and a connecting hole 501 having its inner peripheral surface formed with a female spline 499 is bored in an axial core portion of the second spur gear 493 on the other hand. The male spline 495 engages with the female spline 499, whereby the first spur gears 495, 499 are so connected to each other as to be slidable in the axial direction with predetermined relative rotations.

Annular recessed portions 489, 490 are formed in the inner side end surfaces of the first and second spur gears 491, and the compression coil spring 475 described above is fitted and thus accommodated in these annular recessed portions 487, 489. In the case of this embodiment, the first and second spur gears 491, 493 are formed so that tooth traces thereof become coincident just when getting close to each other with a predetermined quantity from the state shown in FIG. 16.

An operation of the second embodiment of the fourth invention will hereinafter be explained.

Figure 17:
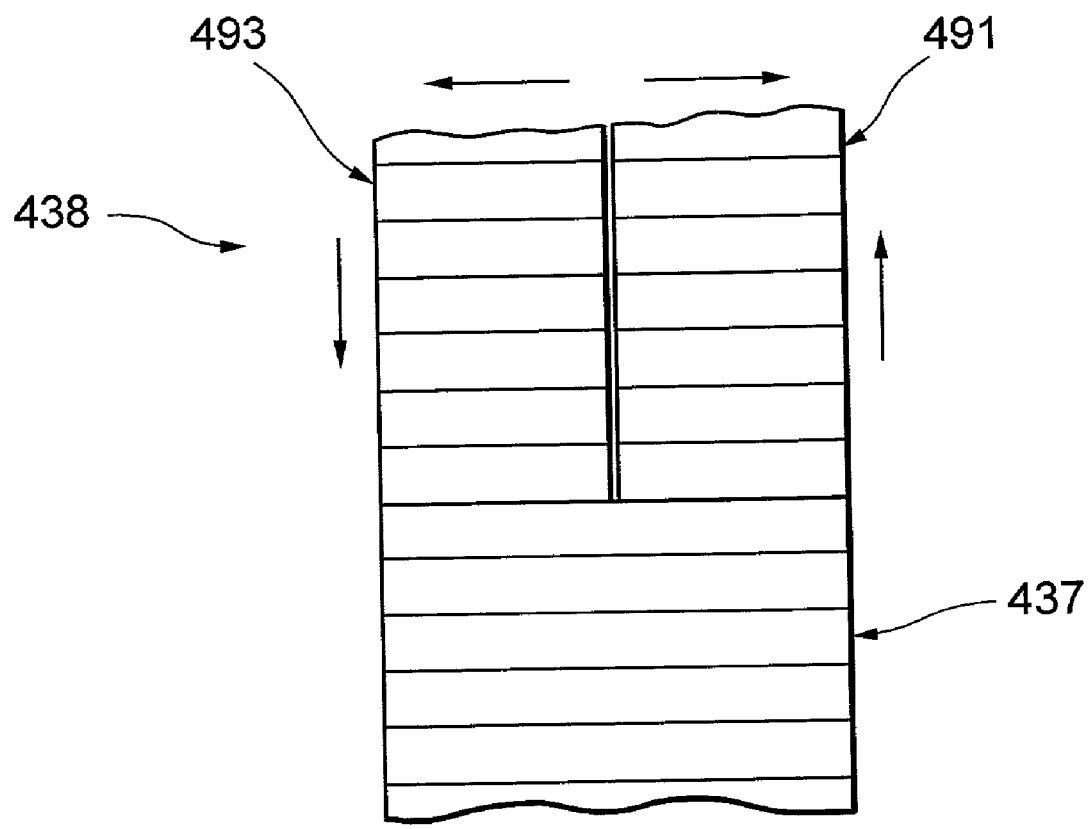
FIG. 17 is an explanatory view showing an operation in the second embodiment of the fourth invention.
Figure 18:
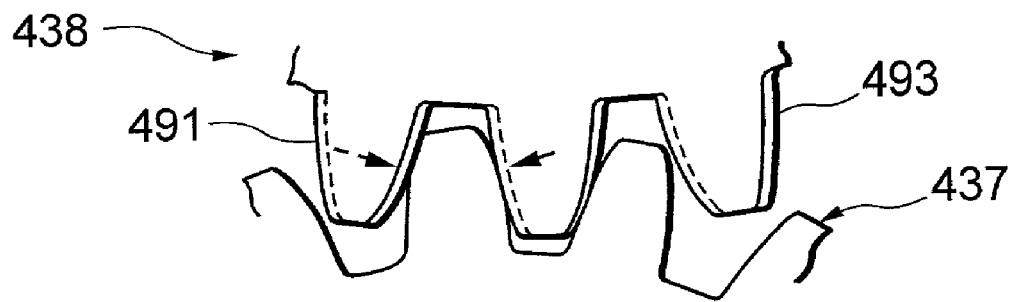
FIG. 18 is an explanatory view showing the operation in the second embodiment of the fourth invention.
Figure 19:
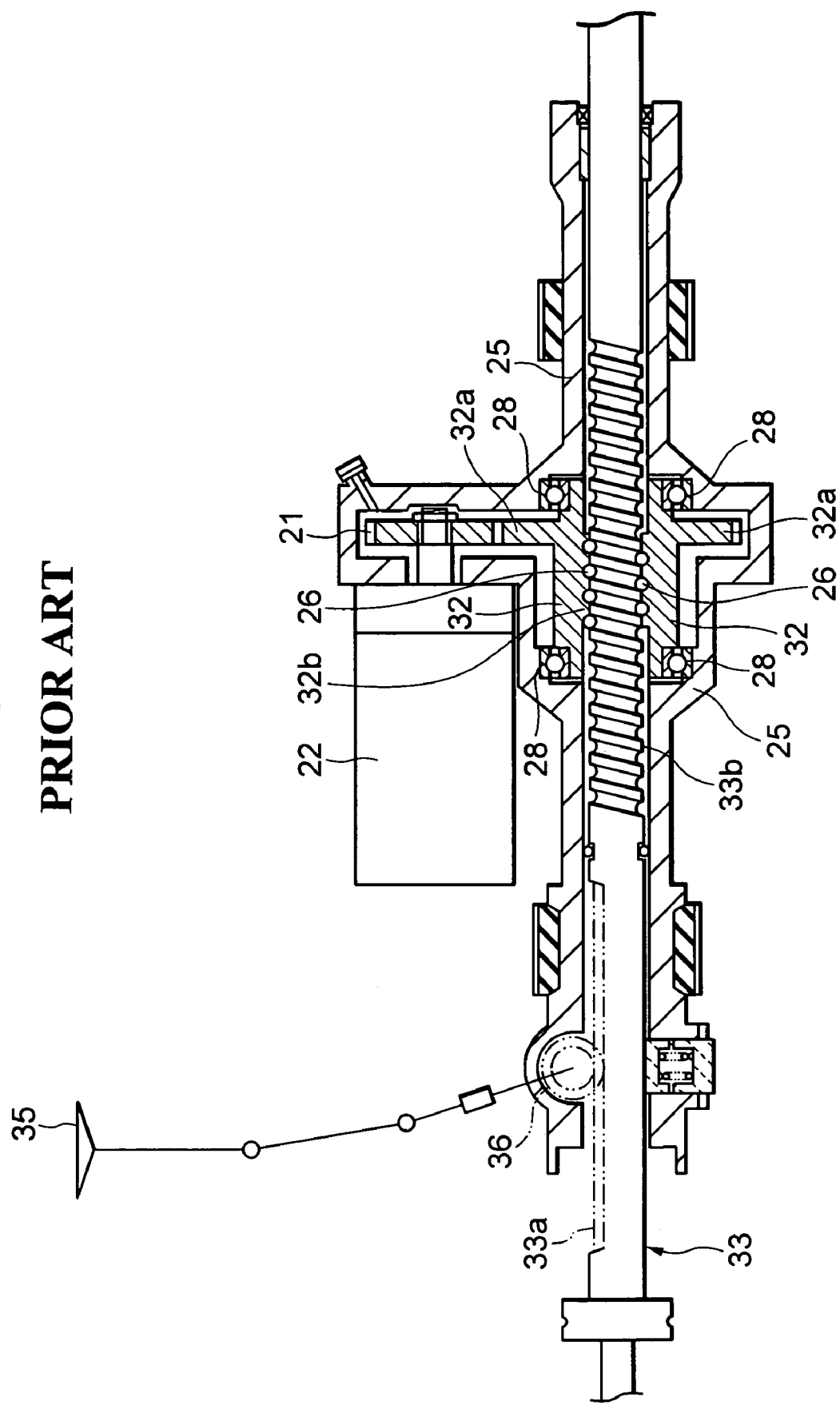
FIG. 19 is a sectional view showing a configuration of a conventional electric power steering apparatus.

If a backlash b' exists between the drive gear 437 and the first spur gear 491, when biased by the compression coil spring 475 as shown in FIG. 17, the first and second spur gears 491, 493 rotate while becoming apart from each other in the axial direction, and, as illustrated in FIG. 18, the teeth of the two spur gears 491, 493 seizure and hold by pressure the teeth of the drive gear 437.

With this configuration, it does not happen in this second embodiment that the drive gear 437 loosely moves with respect to the idler gear 438 when reversely rotated in steering, and the silence when the EPS apparatus operates is remarkably improved. Note that the discussion made so far is related to the drive gear 437 and the idler gear 438, however, the same effect can be obtained with respect to the idler gear 438 and the driven gear 439 if the quantity of the backlash remains unchanged.

The discussions on the specific embodiments of the fourth invention come to an end so far, however, the mode of the fourth invention is not restricted to the embodiments described above. For example, in the embodiments given above, the fourth invention is applied to the idler gear of the gear train for transmitting the driving force of the EPS apparatus and may also be applied to the scissors gear used for a power valve system of an internal combustion engine and for the power transmission system of an industrial machine. Further, the embodiments described above adopt such a configuration that the couple of helical or spur gears separated away from each other by use of one piece of compression coil spring but may be made close to each other, and the biasing member may involve the use of a tensile coil spring, a belleville spring, a leaf spring and others. The number of these biasing members and an installing mode can be properly selected. The whole configuration of the steering gear and the structure of the power assist mechanism and others, may be properly modified corresponding to requests in terms of designs and specifications if within the range that does not deviate from the concept of the present invention.

As discussed above, each of the scissors gear and the electric power steering apparatus of the fourth invention, includes the first helical gear, the second helical gear engaging with the first helical gear so as to be slidable in the axial direction, and the biasing member that make the first and second helical gears apart from or close to each other in the axial direction. With this configuration, the first and second helical gears become apart from or close to each other in the axial direction, with the result that the teeth of the helical gears meshing with the scissors gear are seized and held by pressure. It is therefore possible, though taking the simple configuration requiring a comparatively small number of parts, to effectively prevent the emission of the gear butting noises due to the lose movement.

What is claimed is:

1. An electric power steering apparatus comprising:
a rotary shaft member connected to a steering wheel and rotating together with the steering wheel;
an elongate member capable of making a rectilinear motion in either of opposite directions in order to steer dirigible wheels;
a rack-and-pinion mechanism connected drivewise to said rotary shaft member and said elongate member and constructed of a pinion gear rotating based on said rotary shaft member and of a rack gear provided in a first axial position of said elongate member and meshing with said pinion gear;
a ball screw mechanism constructed of a screw member provided in a second axial position of said elongate member, a nut member surrounding at least a part of said screw member and a multiplicity of balls interposed between said screw member and said nut member;
an electric motor having an axis parallel to that of said elongate member; and
a meshing rotation decelerating mechanism including a plurality of meshing components in order to decelerate rotation of an output shaft of said electric motor unit and to transfer the decelerated rotations to said nut member of said ball screw mechanism, said plurality of meshing components including:
a first gear attached to the electric motor unit,
a second gear attached to the nut member, and
a third gear, arranged in a rotation transmission path between the first gear and the second gear, having a contact portion composed of a synthetic resin;
wherein the first gear is an electric motor pinion gear, the second gear is a deceleration gear and the third gear is an idler gear that meshes with the electric motor pinion gear and the deceleration gear; and
wherein the idler gear is rotatably supported on an idler gear shaft, fixed at each end to a gear housing, by a plurality of preloaded bearings disposed inside the idler gear.

2. An electric power steering apparatus according to claim 1, wherein the plurality of bearings are deep groove ball bearings.

3. An electric power steering apparatus according to claim 1, wherein the plurality of bearings are angular ball bearings.

4. An electric power steering apparatus according to claim 1, wherein the plurality of bearings are taper roller bearings.

5. An electric power steering apparatus according to claim 1, wherein both the first gear and the second gear are metal gears, and the third gear has a metal core and a toothed contact portion which is composed of a synthetic resin.

* * * * *